(12) United States Patent
Enokida et al.

(10) Patent No.: US 11,372,611 B2
(45) Date of Patent: Jun. 28, 2022

(54) VEHICULAR DISPLAY CONTROL SYSTEM AND NON-TRANSITORY COMPUTER READABLE MEDIUM STORING VEHICULAR DISPLAY CONTROL PROGRAM

(71) Applicant: DENSO CORPORATION, Kariya (JP)

(72) Inventors: Susumu Enokida, Kariya (JP); Yukihide Ota, Kariya (JP); Takeshi Kondo, Kariya (JP); Kunihiro Nakagawa, Kariya (JP); Hirofumi Tsuji, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/101,670

(22) Filed: Nov. 23, 2020

(65) Prior Publication Data

US 2021/0072943 A1 Mar. 11, 2021

Related U.S. Application Data

(63) Continuation of application No. PCT/JP2019/018244, filed on May 7, 2019.

(30) Foreign Application Priority Data

May 25, 2018 (JP) .............................. JP2018-100571

(51) Int. Cl.
*G06F 3/048* (2013.01)
*G06F 3/14* (2006.01)
(Continued)

(52) U.S. Cl.
CPC ........ *G06F 3/1423* (2013.01); *B60R 11/0229* (2013.01); *G06F 3/0488* (2013.01);
(Continued)

(58) Field of Classification Search
CPC ................ B60K 35/00; B60K 2370/52; B60K 2370/146; B60K 2370/11; B60K 2370/15;
(Continued)

(56) References Cited

U.S. PATENT DOCUMENTS 6,474,688 B1 * 11/2002 Bogren ............... B60R 11/0235
280/771
6,961,644 B2 * 11/2005 Mercier ................ B62D 1/046
345/184

(Continued)

FOREIGN PATENT DOCUMENTS

| JP | 2009161049 A | 7/2009 |
| JP | 2012003508 A | 1/2012 |

(Continued)

OTHER PUBLICATIONS

Kim et al., User-Adaptive Interface with Reconfigurable Keypad for In-vehicle Information System; 2008; IEEE; 6 pages.*

(Continued)

*Primary Examiner* — Linh K Pham
(74) *Attorney, Agent, or Firm* — Harness, Dickey & Pierce, P.L.C.

(57) ABSTRACT

A vehicular display control system includes first and second displays disposed in a vehicle interior, a screen switching operation receiver, and a screen switching controller. The screen switching operation receiver is disposed at a position in the vehicle interior operable by a user while maintaining a driving posture, and receives a first screen switching operation and a second screen switching operation from the user. The screen switching controller performs a first screen switching control for switching a display of a content screen on the first display when the first screen switching operation is received and performs a second screen switching control for switching a display of a content screen on the second (Continued)

display when the second screen switching operation is received.

14 Claims, 21 Drawing Sheets

(51) Int. Cl.
    *B60R 11/02*     (2006.01)
    *G06F 3/04817*     (2022.01)
    *G06F 3/0488*     (2022.01)
    *B60R 11/00*     (2006.01)

(52) U.S. Cl.
    CPC .. *G06F 3/04817* (2013.01); *B60R 2011/0005* (2013.01); *B60R 2011/0007* (2013.01)

(58) Field of Classification Search
    CPC ...... B60K 2370/1438; B60K 2370/143; B60K 2370/166; B60K 2370/122; B60K 2370/782; B60K 37/06; B60R 2011/0005; G06F 3/04817; G06F 3/0482; G06F 3/04847; G06F 3/0488
    See application file for complete search history.

(56) References Cited

U.S. PATENT DOCUMENTS

| | | | | |
|---|---|---|---|---|
| 7,414,520 | B2 * | 8/2008 | Meißner | G08G 1/166 116/36 |
| 7,607,087 | B2 * | 10/2009 | Prados | B60K 35/00 715/702 |
| 8,471,401 | B2 * | 6/2013 | Onaka | H01H 19/003 307/9.1 |
| 8,988,399 | B2 * | 3/2015 | Szczerba | G06F 3/0362 345/184 |
| 2003/0023353 | A1 * | 1/2003 | Badarneh | B60K 37/06 701/1 |
| 2003/0074119 | A1 * | 4/2003 | Arlinsky | B60R 11/0241 701/1 |
| 2005/0096812 | A1 * | 5/2005 | Nezu | G06F 3/04847 701/1 |
| 2006/0095177 | A1 * | 5/2006 | Donk | B60K 37/06 701/1 |
| 2008/0001931 | A1 * | 1/2008 | Szczerba | G06F 3/04847 345/184 |
| 2008/0211779 | A1 * | 9/2008 | Pryor | G06F 3/0488 345/173 |
| 2008/0211832 | A1 * | 9/2008 | Kumon | B60K 35/00 345/641 |
| 2009/0164062 | A1 * | 6/2009 | Aoki | B60Q 1/0082 701/36 |
| 2009/0177392 | A1 | 7/2009 | Komaba | |
| 2011/0310034 | A1 | 12/2011 | Ouchi et al. | |
| 2013/0111403 | A1 * | 5/2013 | Nakamura | B60K 35/00 715/810 |
| 2013/0176246 | A1 * | 7/2013 | Kohigashi | G06F 3/0488 345/173 |
| 2014/0165005 | A1 * | 6/2014 | Takikawa | B60K 37/06 715/835 |
| 2014/0292695 | A1 * | 10/2014 | Wakamoto | B60K 37/06 345/173 |
| 2014/0320200 | A1 * | 10/2014 | Dohi | H03K 17/962 327/517 |
| 2015/0002212 | A1 * | 1/2015 | Dohi | H03K 17/9622 327/517 |
| 2015/0015479 | A1 * | 1/2015 | Cho | G06F 3/1423 345/156 |
| 2015/0073604 | A1 * | 3/2015 | Ro | B60H 1/00971 700/276 |
| 2016/0167512 | A1 * | 6/2016 | Joo | B60K 35/00 345/167 |
| 2016/0200195 | A1 * | 7/2016 | Jun | G06F 3/04883 715/765 |
| 2016/0291862 | A1 * | 10/2016 | Yaron | G06F 3/04883 |
| 2017/0053444 | A1 * | 2/2017 | Huang | G06F 3/04842 |
| 2017/0060358 | A1 * | 3/2017 | Hirano | G06F 3/0485 |
| 2018/0088770 | A1 * | 3/2018 | Brombach | B60K 37/06 |
| 2018/0101351 | A1 * | 4/2018 | Kumon | G01C 21/3664 |
| 2018/0373250 | A1 * | 12/2018 | Nakamura | G05D 1/0274 |
| 2019/0095227 | A1 * | 3/2019 | Hwang | H04L 63/0861 |
| 2019/0283770 | A1 * | 9/2019 | Kubota | B60W 50/082 |
| 2020/0339174 | A1 * | 10/2020 | Sakamaki | B62D 1/046 |
| 2021/0072943 | A1 * | 3/2021 | Enokida | G06F 3/1438 |

FOREIGN PATENT DOCUMENTS

| | | |
|---|---|---|
| JP | 2017045104 A | 3/2017 |
| JP | 2018060388 A | 4/2018 |

OTHER PUBLICATIONS

Cairnie et al., A Prototype Adaptive Finger-Pointing Interface for Operating Secondary Control in Motor Vehicle; 2000; IEEE; 6 pages.*

Quintal et al., HapWheel: In-Car Infotainment System Feedback Using Haptic and Hovering Techniques; 2021; IEEE; 10 pages.*

* cited by examiner

VEHICULAR DISPLAY CONTROL SYSTEM AND NON-TRANSITORY COMPUTER READABLE MEDIUM STORING VEHICULAR DISPLAY CONTROL PROGRAM

CROSS REFERENCE TO RELATED APPLICATIONS

The present application is a continuation application of International Patent Application No. PCT/JP2019/018244 filed on May 7, 2019, which designated the U.S. and claims the benefit of priority from Japanese Patent Application No. 2018-100571 filed on May 25, 2018. The entire disclosures of all of the above applications are incorporated herein by reference.

TECHNICAL FIELD

The present disclosure relates to a vehicular display control system, and a non-transitory computer readable medium storing vehicular display control program.

BACKGROUND

Contents provided in a vehicle interior include various things. For example, there has been proposed a configuration in which a plurality of content screens such as a navigation screen, an audio screen, and an air conditioner screen are displayed at the same time.

SUMMARY

The present disclosure provides a vehicular display control system and a non-transitory computer readable medium storing a vehicular display control program for the vehicular display control system. The vehicular display control system includes first and second displays disposed in a vehicle interior, and a screen switching operation receiver such as a touch panel. The screen switching operation receiver is disposed at a position in the vehicle interior operable by a user while maintaining a driving posture, and receives a first screen switching operation and a second screen switching operation from the user. A display of a content screen on the first display is switched when the first screen switching operation is received, and a display of a content screen on the second display is switched when the second screen switching operation is received.

BRIEF DESCRIPTION OF DRAWINGS

Objects, features and advantages of the present disclosure will become apparent from the following detailed description made with reference to the accompanying drawings. In the drawings.

DETAILED DESCRIPTION

With diversification of content screens, various types of display devices for displaying the content screens are installed. As a configuration equipped with a plurality of display devices in the vehicle interior, for example, an operation display capable of being operated by a user who is a driver while maintaining a driving posture may be arranged at a position relatively close to the driver's seat, and a distant display visible from the user without moving a sight line from forward of a vehicle may be arranged at a position relatively far from the driver's seat.

If a touch panel is provided on both the operation display and the distant display in the above configuration, the user may lose the driving posture when operating the distant display, which may lower operability and safety.

According to one aspect of the present disclosure, a vehicular display control system includes first and second displays disposed in a vehicle interior, a screen switching operation receiver, and a screen switching controller. The screen switching operation receiver is disposed at a position in the vehicle interior operable by a user while maintaining a driving posture, and is configured to receive a first screen switching operation and a second screen switching operation from the user. The screen switching controller is configured to perform a first screen switching control for switching a display of a content screen on the first display when the screen switching operation receiver receives the first screen switching operation from the user and perform a second screen switching control for switching a display of a content screen on the second display when the screen switching operation receiver receives the second screen switching operation from the user.

Regardless of the positions where the first display and the second display are arranged in the vehicle interior, the user can switch the display of the content screen on each of the first display and the second display by performing the screen switching operation while maintaining the driving posture. As a result, the user can appropriately switch the display of the content screen on the plurality of displays without impairing the operability and safety.

Figure 1:
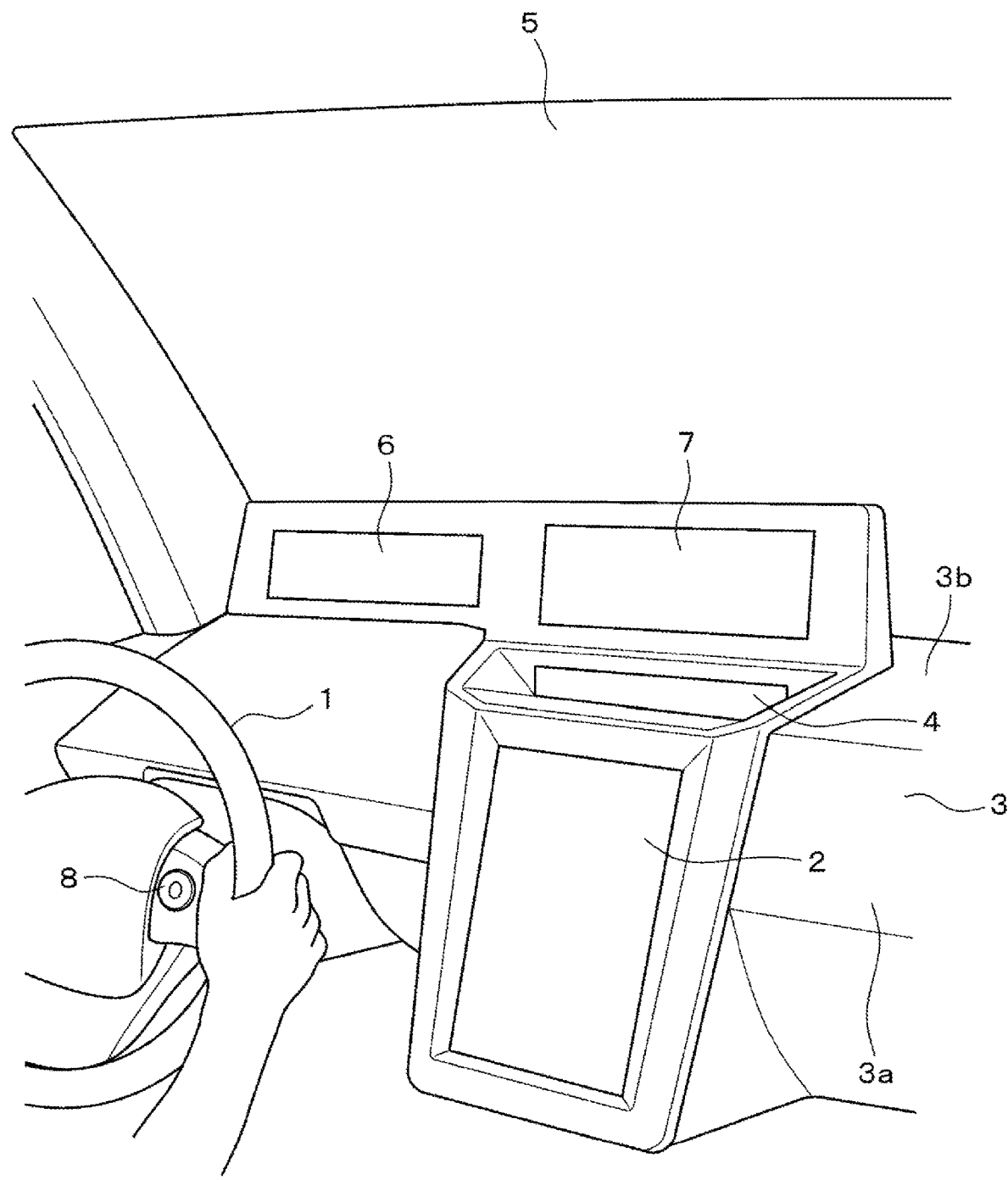
FIG. 1 is a diagram showing an arrangement of devices in a vehicle interior according to an embodiment.

Hereinafter, an embodiment of the present disclosure will be described with reference to the drawings. In the present embodiment, a configuration applied to a vehicle in which a driver's seat is arranged on a left side when viewed in a forward direction of a vehicle will be described as an example. As shown in FIG. 1, in a vehicle interior, an operation display 2 is arranged on a front surface portion 3a of a dashboard 3 on the right of a steering wheel 1 (that is closer to a center of the vehicle interior). That is, the operation display 2 is arranged at a position relatively close to the driver's seat and is operable by a user while maintaining a driving posture. The user can operate the operation display 2 while maintaining the driving posture, but when visually recognizing a screen of the operation display 2, a sight line moves from forward of the vehicle. A cooperative effect display 4 is arranged above the operation display 2.

Between the steering wheel 1 and a windshield 5, a meter display 6 and a distant display 7 are arranged side by side in a left-right direction on the upper surface portion 3b of the dashboard 3 within a range that does not obstruct a front view of the user. That is, the distant display 7 is arranged at a position relatively far from the driver's seat and visible to the user without moving the sight line from forward of the vehicle. The user can visually recognize a screen of the distant display 7 without moving the sight line from forward of the vehicle. The meter display 6 and the distant display 7 may be integrally configured or may be configured separately. On the steering wheel 1, a steering switch 8 operable by the user is arranged. The user can operate the steering switch 8 while maintaining the driving posture. The steering switch 8 may have any shape such as a cross shape, a push type, a toggle type, and a seesaw type.

Figure 2:
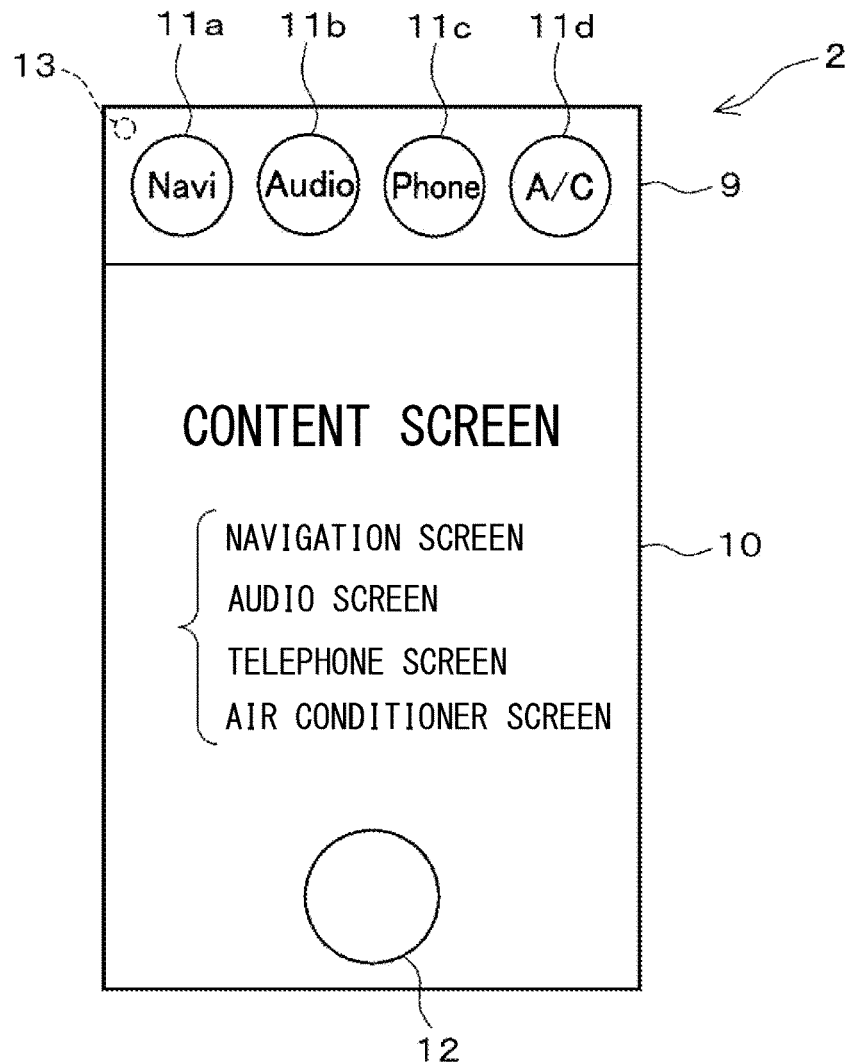
FIG. 2 is a diagram showing an operation display.

The operation display 2 is, for example, a 11.6 inch type display. As shown in FIG. 2, an upper portion of the operation display 2 is an icon display 9, and a lower portion of the operation display 2 is a content screen display 10 corresponding to a first display. An entire display surface of the operation display 2 is a touch panel. The icon display 9 displays icons indicating contents side by side in the left-right direction. In the present embodiment, the icons displayed by the icon display 9 include a navigation icon 11a, an audio icon 11b, a telephone icon 11c, and an air conditioner icon 11d. The icon display 9 also displays a left-right scroll key, and when the user operates the left-right scroll key, icons other than the above-described icons 11a to 11d are also scroll-displayed.

The content screen display 10 can display a content screen. In the present embodiment, the content screen displayed by the content screen display 10 includes a navigation screen, an audio screen, a telephone screen, and an air conditioner screen. The navigation screen is a screen that displays a current position of the vehicle on a map, a route from the current position to a destination, an estimated arrival time to the destination, and the like. The audio screen is a screen that displays the type of content such as a radio or a recording medium, a radio channel, a list of music being played, a volume setting, and the like. The telephone screen is a screen that displays a status type such as waiting for an incoming call or ringing, an incoming telephone number, a calling number, a telephone directory list, and the like. The air conditioner screen is a screen that displays a temperature setting, a wind direction setting, and the like.

Further, the operation display 2 has a dial 12 that can be rotated and pushed by the user, and also has a camera 13 that photographs the area around eyes of the user sitting in the driver's seat. In the present embodiment, the camera 13 is provided integrally with the operation display 2, but the camera 13 may be provided separately from the operation display 2.

Figure 3:
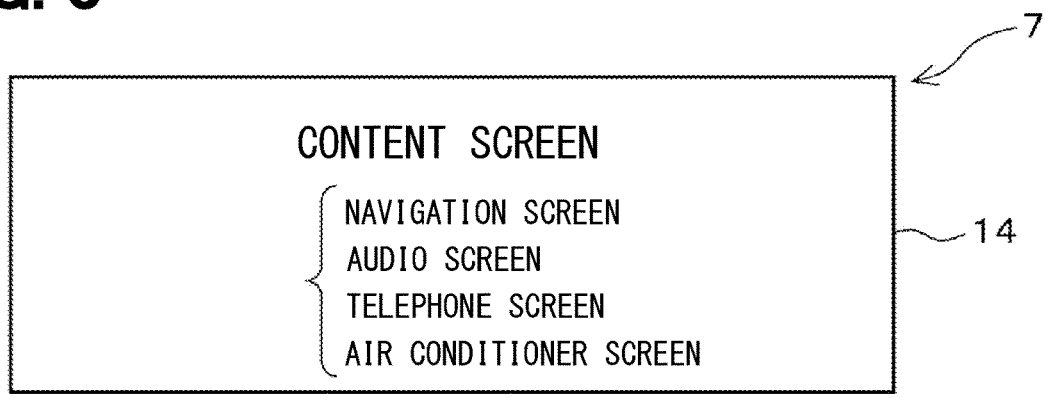
FIG. 3 is a diagram showing a distant display.

The distant display 7 is, for example, a 12.3 inch type display. As shown in FIG. 3, an entire display surface of the distant display 7 is a content screen display 14 corresponding to a second display. In the present embodiment, the content screen displayed by the content screen display 14 includes a navigation screen, an audio screen, a telephone screen, and an air conditioner screen, similarly to the content screen displayed by the content screen display 10 of the operation display 2. That is, in the vehicle interior, the content screen is displayed on the operation display 2 and the content screen is displayed on the distant display 7, so that the two content screens are simultaneously displayed on the two displays having different arrangement positions.

Figure 4:
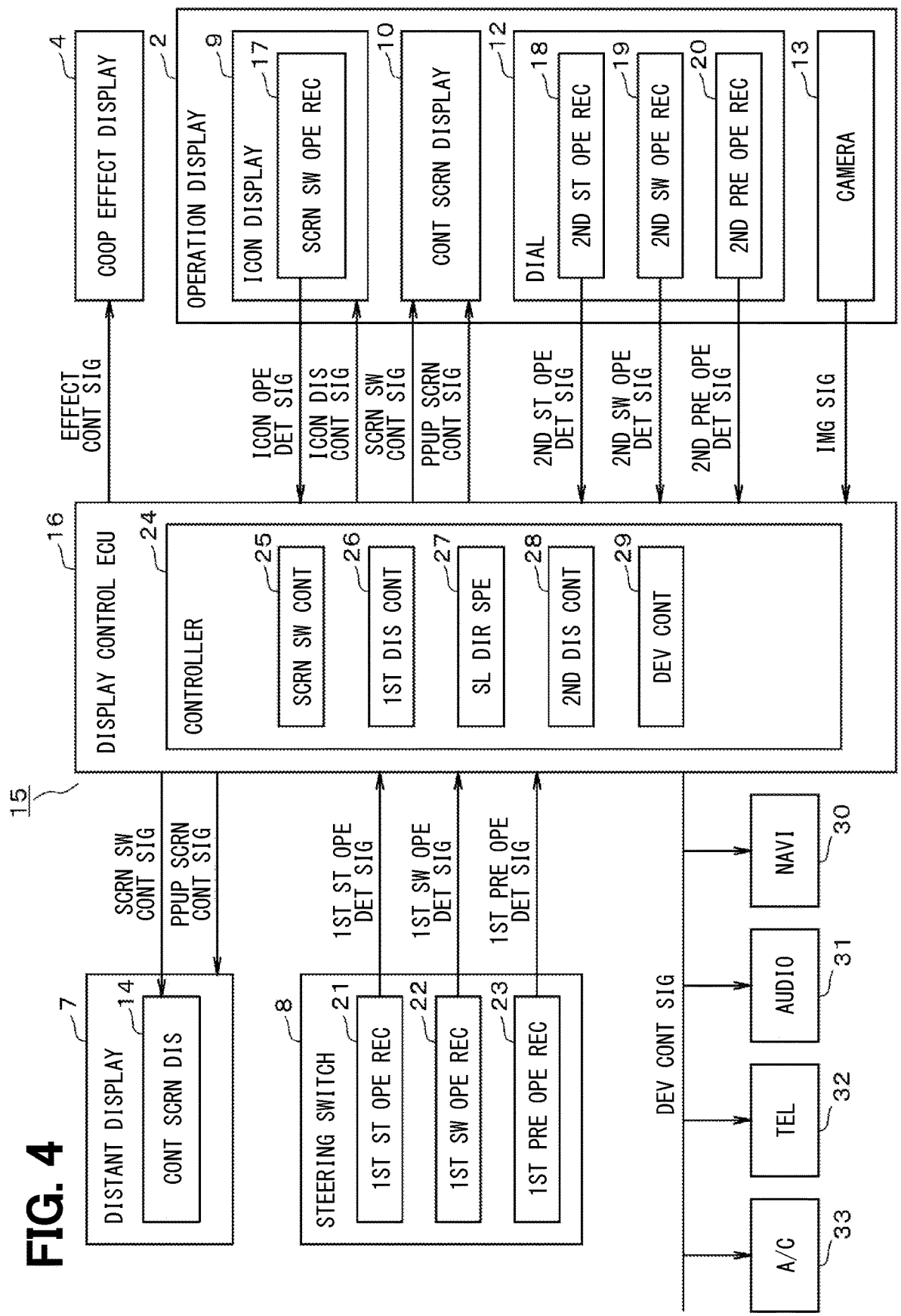
FIG. 4 is a functional block diagram showing an overall configuration of a vehicular display control system.
Figure 5:
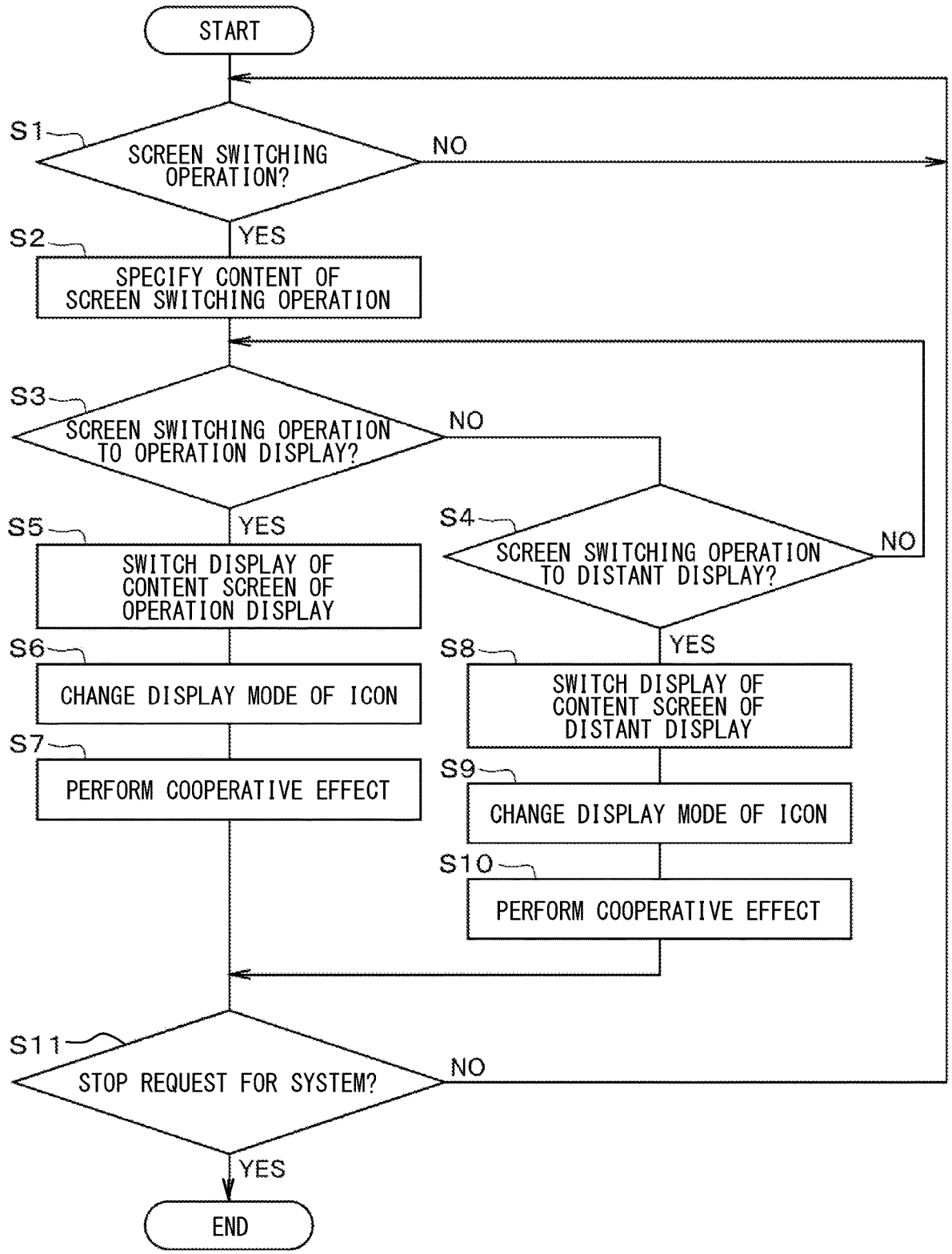
FIG. 5 is a flowchart showing icon operation determination processing.

As shown in FIG. 4, a vehicular display control system 15 includes a display control ECU (Electronic Control Unit) 16, the operation display 2, the cooperative effect display 4, the distant display 7, and the steering switch 8. These parts are connected by vehicle harnesses. The connection by the vehicle harnesses may be performed by an in-vehicle LAN such as CAN (Controller Area Network, registered trademark), FlexRay (registered trademark), MOST (Media Oriented Systems Transport, registered trademark), or AVC-LAN (Audio visual Communication-Local Area Network). The vehicular display control system 15 switches between a start state and a sleep state in conjunction with an on-off state of an ACC power supply. The vehicular display control system 15 shifts to the start state when the ACC power supply is switched from off to on, and shifts to the sleep state when the ACC power supply is switched from on to off.

In the operation display 2, the icon display (ICON DISPLAY) 9 includes a screen switching operation receiver (SCRN SW OPE REC) 17. When the user performs an operation on any of the icons 11a to 11d, the screen switching operation receiver 17 accepts the operation as a screen switching operation and outputs an icon operation detection signal (ICON OPE DET SIG) indicating the operation to the display control ECU 16. When the user performs an operation on any of the icons 11a to 11d, the screen switching operation receiver 17 accepts the operation as a screen switching operation and outputs an icon operation detection signal (ICON OPE DET SIG) indicating the operation to the display control ECU 16. Further, when the icon display 9 receives an icon display control signal (ICON DIS CONT SIG) from the display control ECU 16, the icon display 9 changes a display mode of the icons 11a to 11d according to the received icon display control signal.

When the content screen display (CONT SCRN DISPLAY) 10 receives a screen switching control signal (SCRN SW CONT SIG) from the display control ECU 16, the content screen display 10 switches the display of the content screen according to the received screen switching control signal. Further, when the content screen display 10 receives a pop-up screen control signal (PPUP SCRN CONT SIG) from the display control ECU 16, the content screen display 10 starts or switches a display of a pop-up screen on the content screen or updates the display of a predetermined item in the pop-up screen according to the received pop-up screen control signal.

The dial 12 includes a second start operation receiver (2ND ST OPE REC) 18, a second switching operation receiver (2ND SW OPE REC) 19, and a second predetermined operation receiver (2ND PRE OPE REC) 20. When the user touches the dial 12, the second start operation receiver 18 accepts the operation as a display start operation of the pop-up screen, and outputs a second start operation detection signal (2ND ST OPE DET SIG) indicating the display start operation to the display control ECU 16. When the user presses the dial 12, the second switching operation receiver 19 accepts the operation as a display switching operation of the pop-up screen, and outputs a second switching operation detection signal (2ND SW OPE DET SIG) indicating the display switching operation to the display control ECU 16. When the user performs an operation of rotating the dial 12, the second predetermined operation receiver 20 accepts the operation as a predetermined operation for a predetermined item in the pop-up screen, and outputs a second predetermined operation detection signal (2ND PRE OPE DET SIG) indicating the predetermined operation to the display control ECU 16. When the camera 13 photographs an image, the camera 13 outputs an image signal (IMG SIG) including the image to the display control ECU 16.

When the cooperative effect display (COOP EFFECT DISPLAY) 4 receives an effect control signal (EFFECT CONT SIG) from the display control ECU 16, the cooperative effect display 4 executes a cooperative effect according to the received effect control signal.

In the distant display 7, when the content screen display (CONT SCRN DIS) 14 receives a screen switching control signal (SCRN SW CONT SIG) from the display control ECU 16, the content screen display 14 switches the display of the content screen according to the received screen switching control signal. Further, when the content screen display 14 receives a pop-up screen control signal (PPUP SCRN CONT SIG) from the display control ECU 16, the content screen display 14 starts or switches a display of a pop-up screen on the content screen or updates the display of a predetermined item in the pop-up screen according to the received pop-up screen control signal.

The steering switch 8 includes a first start operation receiver (1ST ST OPE REC) 21, a first switching operation receiver (1ST SW OPE REC) 22, and a first predetermined operation receiver (1ST PRE OPE REC) 23. When the user operates the steering switch 8 to perform the display start operation of the pop-up screen, the first start operation receiver 21 outputs a first start operation detection signal (1ST ST OPE DET SIG) indicating the display start operation to the display control ECU 16. When the user performs a display switching operation of the pop-up screen, the first switching operation receiver 22 outputs a first switching operation detection signal (1ST SW OPE DET SIG) indicating the display switching operation to the display control ECU 16. When the user performs a predetermined operation for a predetermined item in the pop-up screen, the first predetermined operation receiver 23 outputs a first predetermined operation detection signal (1ST PRE OPE DET SIG) indicating the predetermined operation to the display control ECU 16.

The display control ECU 16 includes a controller 24. The controller 24 includes a microcomputer including a CPU (Central Processing Unit), a ROM (Read Only Memory), a RAM (Random Access Memory), and an I/O (Input/Output). The microcomputer executes a computer program stored in a non-transitory tangible storage medium, and executes a process corresponding to the computer program. The computer program executed by the microcomputer includes a vehicular display control program.

The controller 24 includes a screen switching controller (SCRN SW CONT) 25, a first display controller (1ST DIS CONT) 26, a sight line direction specifier (SL DIR SPE) 27, a second display controller (2ND DIS CONT) 28, and a device controller (DEV CONT) 29. When the screen switching controller 25 receives the icon operation detection signal from the icon display 9 of the operation display 2, the screen switching controller 25 specifies that the user has performed the screen switching operation based on the input icon operation detection signal, and outputs the screen switching control signal to the content screen display 10 or the content screen display 14, to switch the display of the content screen on the content screen display 10 or the content screen display 14. Further, the screen switching controller 25 outputs the icon display control signal to the icon display 9, changes the display mode of the icons 11a to 11d, and outputs the effect control signal to the cooperative effect display 4 to cause the cooperative effect.

When the first display controller 26 receives the first start operation detection signal from the steering switch 8, the first display controller 26 specifies, based on the received first start operation detection signal, that the user has operated the steering switch 8 to perform the display start operation of the pop-up screen. The first display controller 26 outputs a pop-up screen control signal (PPUP SCRN CONT SIG) to the distant display 7 to start displaying the pop-up screen.

When the first display controller 26 receives the first switching operation detection signal from the steering switch 8, the first display controller 26 specifies, based on the received first switching operation detection signal, that the user has operated the steering switch 8 to perform the display switching operation of the pop-up screen. The first display controller 26 outputs a pop-up screen control signal to the distant display 7 to switch the display of the pop-up screen.

When the first display controller 26 receives the first predetermined operation detection signal from the steering switch 8, the first display controller 26 specifies, based on the received first predetermined operation detection signal, that the user has operated the steering switch 8 to perform a predetermined operation for a predetermined item in the pop-up screen. The first display controller 26 outputs a pop-up screen control signal to the distant display 7 to update the display of a predetermined item in the pop-up screen according to the specified predetermined operation.

When the sight line direction specifier 27 receives the image signal from the camera 13 of the operation display 2, the sight line direction specifier 27 specifies the sight line direction of the user from the received image signal.

When the second display controller 28 receives the second start operation detection signal from the dial 12 of the operation display 2, the second display controller 28 specifies, based on the received second start operation detection signal, that the user has operated the dial 12 to perform the display start operation of the pop-up screen. When the sight line direction of the user is in the direction of the distant display 7, the second display controller 28 outputs the pop-up screen control signal to the distant display 7 to start displaying the pop-up screen. When the sight line direction of the user is in the direction of the operation display 2, the second display controller 28 outputs the pop-up screen control signal to the operation display 2 to start displaying the pop-up screen.

When the second display controller 28 receives the second switching operation detection signal from the dial 12 of the operation display 2, the second display controller 28 specifies, based on the received second switching operation detection signal, that the user has operated the dial 12 to perform the display switching operation of the pop-up screen. The second display controller 28 outputs the pop-up screen control signal to the distant display 7 or the operation display 2 to switch the display of the pop-up screen.

When the second display controller 28 receives the second predetermined operation detection signal from the operation display 2, the second display controller 28 specifies, based on the received second predetermined operation detection signal, that the user has operated the dial 12 to perform the predetermined operation for the predetermined item in the pop-up screen. The second display controller 28 outputs a pop-up screen control signal to the distant display 7 or the operation display 2 to update the display of the predetermined item in the pop-up screen according to the specified predetermined operation.

When the device controller 29 receives the first predetermined operation detection signal from the steering switch 8, the device controller 29 specifies, based on the received first predetermined operation detection signal, that the user has operated the steering switch 8 to perform the predetermined operation for the predetermined item in the pop-up screen. When the device controller 29 receives the second predetermined operation detection signal from the dial 12 of the operation display 2, the device controller 29 specifies, based on the received second predetermined operation detection signal, that the user has operated the dial 12 to perform the predetermined operation for the predetermined item in the pop-up screen. The device controller 29 outputs a device control signal (DEV CONT SIG) to an in-vehicle device to control the operation of the in-vehicle device according to the specified predetermined operation.

When the device controller 29 specifies, for example, that the predetermined operation is a destination setting operation of a navigation function, the device controller 29 outputs the device control signal to a navigation device (NAVI) 30 to perform a destination setting in the navigation device 30. When the device controller 29 specifies, for example, that the predetermined operation is a volume setting operation of an audio function, the device controller 29 outputs the device control signal to an audio device (AUDIO) 31 to perform a volume setting in the audio device 31. When the device controller 29 specifies, for example, that the predetermined operation is a call operation of a telephone function, the device controller 29 outputs the device control signal to a telephone device (TEL) 32 to make a call from the telephone device 32. When the device controller 29 specifies, for example, that the predetermined operation is a temperature setting operation of the air conditioner function, the device controller 29 outputs the device control signal to an air conditioner device (A/C) 33 to perform a temperature setting in the air conditioner device 33.

Next, operation of the above configuration will be described with reference to FIGS. 5 to 24. In the display control ECU 16, the controller 24 performs icon operation determination processing, steering switch operation determination processing, and dial operation determination processing in parallel when the vehicular display control system 15 is activated. Hereinafter, each processing will be described.

(1) Icon Operation Determination Processing

The icon operation determination processing will be described with reference to FIGS. 5 to 13. When the controller 24 starts the icon operation determination processing, the controller 24 monitors whether the user has performed the screen switching operation (S1). When the controller 24 receives the icon operation detection signal from the operation display 2 and determines that the user has performed the screen switching operation (S1: YES), the controller 24 specifies the content of the screen switching operation (S2), and determines which of the operation display 2 and the distant display 7 is a target of the screen switching operation (S3, S4).

When the controller 24 determines that the target of the screen switching operation is the operation display 2 (corresponding to a first screen switching operation) (S3: YES), the controller 24 outputs the screen switching control signal to the content screen display 10 to switch the display of the content screen in the content screen display 10 to the content screen corresponding to the specified icons 11*a* to 11*d* (S5, corresponding to a first screen switching control procedure). In addition, the controller 24 outputs the icon display control signal to the icon display 9 to change the display mode of the icons 11*a* to 11*d* in response to switching the content screen of the content screen display 10 (S6). Furthermore, the controller 24 outputs the effect control signal to the cooperative effect display 4 to perform the cooperative effect in response to switching the content screen of the content screen display 10 (S7).

When the controller 24 determines that the target of the screen switching operation is the distant display 7 (corresponding to a second screen switching operation) (S4: YES), the controller 24 outputs the screen switching control signal to the content screen display 14 to switch the display of the content screen of the content screen display 14 to the content screen corresponding to the specified icons 11*a* to 11*d* (S8, corresponding to a second screen switching control procedure). In addition, the controller 24 outputs the icon display control signal to the icon display 9 to change the display mode of the icons 11*a* to 11*d* in response to switching the content screen of the content screen display 10 (S9). Furthermore, the controller 24 outputs the effect control signal to the cooperative effect display 4 to perform the cooperative effect in response to switching the content screen of the content screen display 14 (S10).

The controller 24 determines whether a stop request for the vehicular display control system 15 has be generated (S11), and the above processing is repeated when the controller 24 determines that the stop request for the vehicular display control system 15 has not been generated (S11: NO). The controller 24 determines that the stop request for the vehicular display control system 15 has been generated (S11: YES), for example, when an ACC power supply is switched from on to off when the user gets off the vehicle, and ends the icon operation determination processing.

A specific example will be described below.

(i) A case where a flick operation is assigned as the screen switching operation of the distant display 7 and a press operation is assigned as the screen switching operation of the operation display 2

Figure 6:
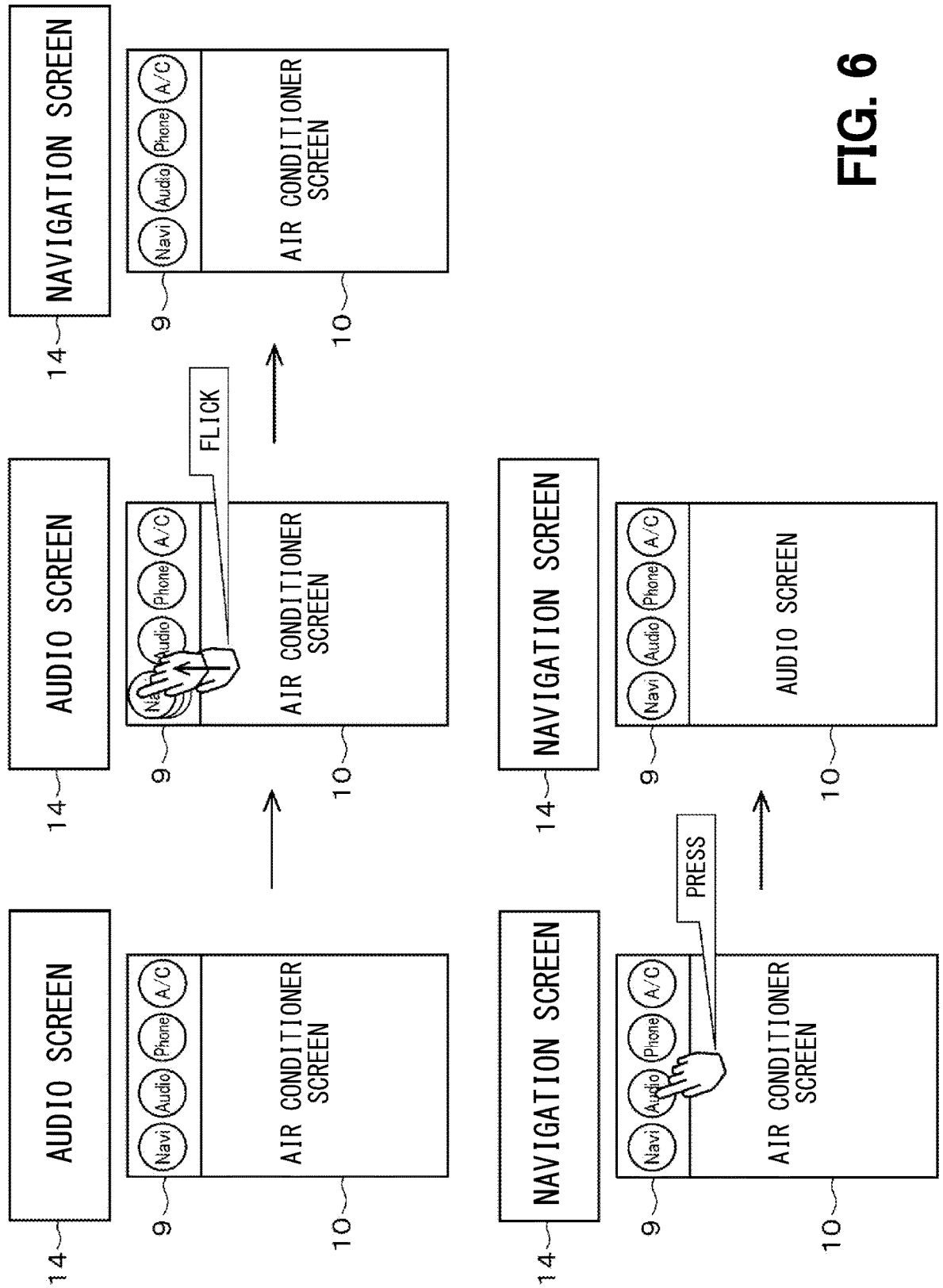
FIG. 6 is a diagram showing a mode in which a content screen is switched.

As shown in FIG. 6, when the user flicks the navigation icon 11*a* (corresponding to the second predetermined operation) from a state where the air conditioner screen is displayed on the operation display 2 and the audio screen is displayed on the distant display 7, the controller 24 switches the content screen of the distant display 7 from the audio screen to the navigation screen. Then, when the user presses the audio icon 11b (corresponding to the first predetermined operation) from this state, the controller 24 switches the content screen of the operation display 2 from the air conditioner screen to the audio screen.

(ii) A case where a touch operation is assigned as the screen switching operation of the distant display 7 and a press operation is assigned as the screen switching operation of the operation display 2

Figure 7:
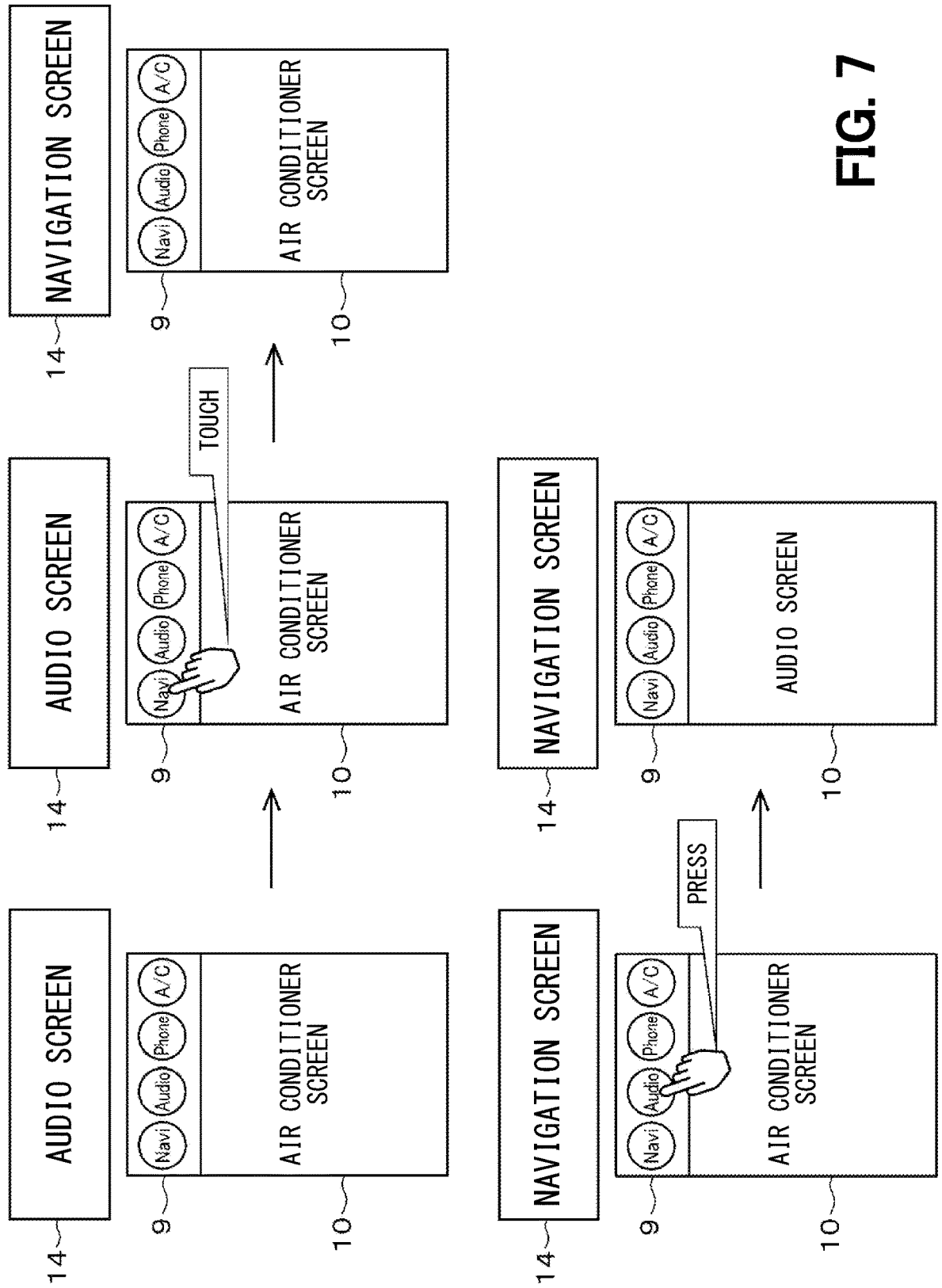
FIG. 7 is a diagram showing another mode in which the content screen is switched.

As shown in FIG. 7, when the user touches the navigation icon 11a (corresponding to the second predetermined operation) from a state where the air conditioner screen is displayed on the operation display 2 and the audio screen is displayed on the distant display 7, the controller 24 switches the content screen of the distant display 7 from the audio screen to the navigation screen. Then, when the user presses the audio icon 11b (corresponding to the first predetermined operation) from this state, the controller 24 switches the content screen of the operation display 2 from the air conditioner screen to the audio screen.

(iii) A case where a touch operation is assigned as the screen switching operation of the distant display 7 and a drag operation is assigned as the screen switching operation of the operation display 2

Figure 8:
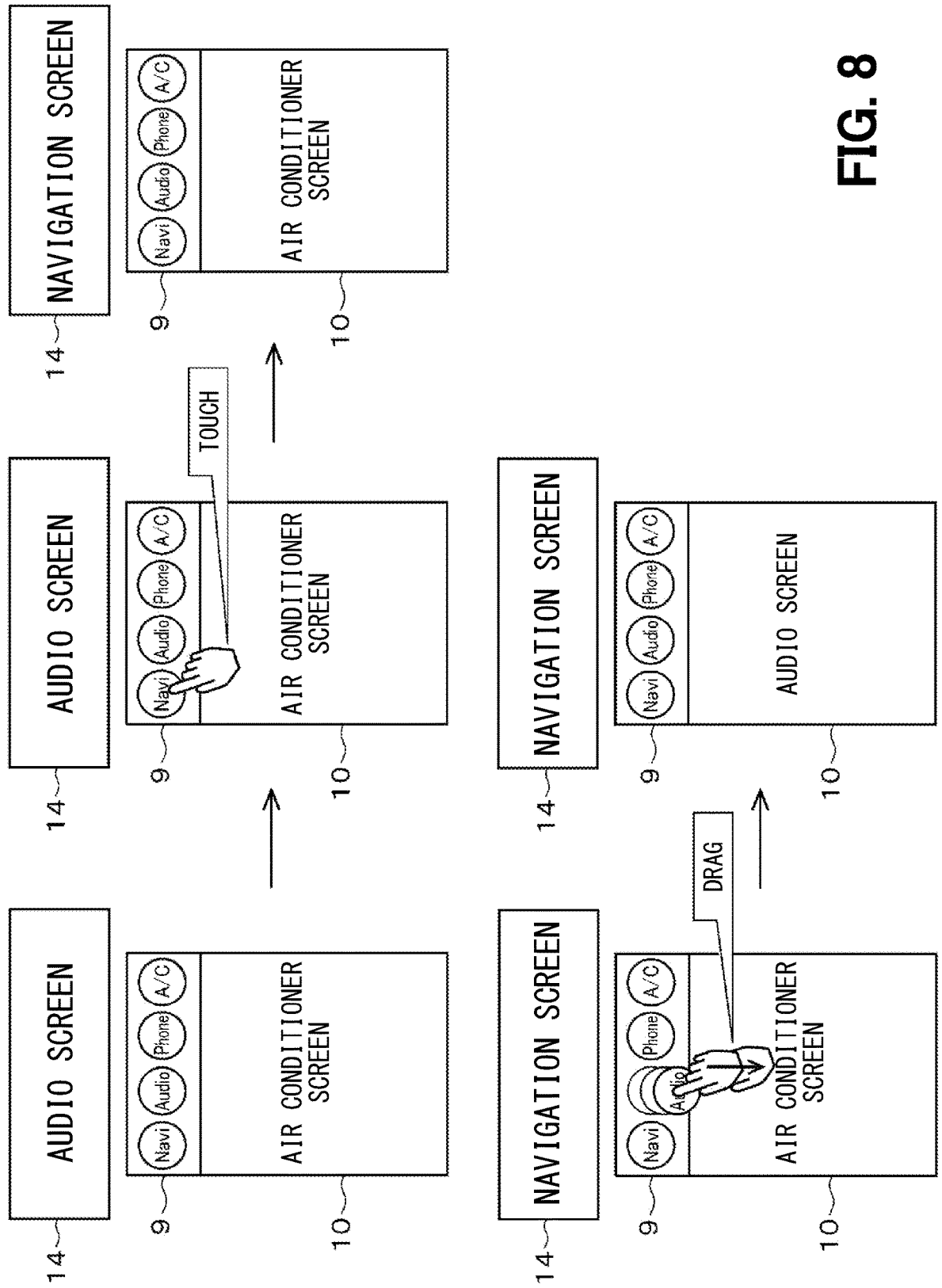
FIG. 8 is a diagram showing another mode in which the content screen is switched.

As shown in FIG. 8, when the user touches the navigation icon 11a (corresponding to the second predetermined operation) from a state where the air conditioner screen is displayed on the operation display 2 and the audio screen is displayed on the distant display 7, the controller 24 switches the content screen of the distant display 7 from the audio screen to the navigation screen. Then, when the user drags the audio icon 11b (corresponding to the first predetermined operation) from this state, the controller 24 switches the content screen of the operation display 2 from the air conditioner screen to the audio screen.

The operation for switching the display of the content screen of the distant display 7 and the operation for switching the display of the content screen of the operation display 2 have only to be different from each other, and may be operations other than the flick operation, the touch operation, the press operation, and the drag operation described above.

Figure 9:
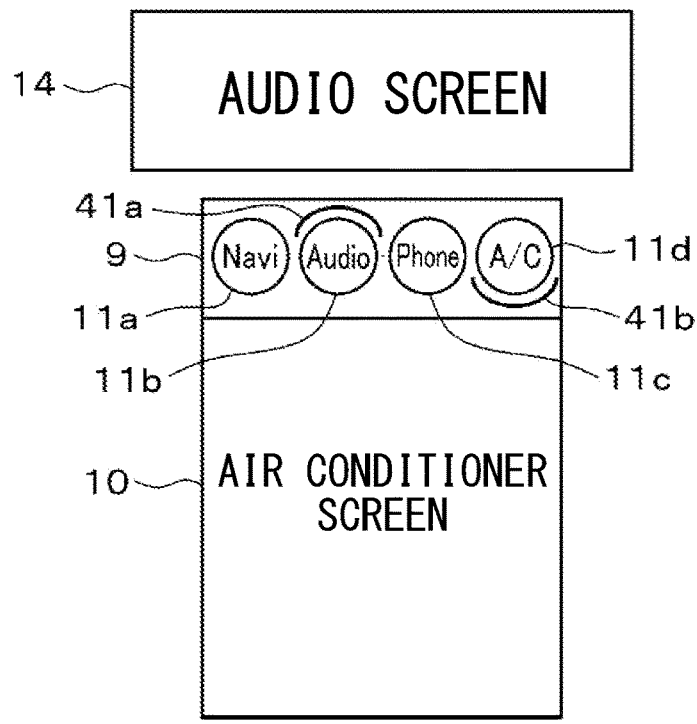
FIG. 9 is a diagram showing a display mode of icons.

Further, the controller 24 changes the display mode of the icons 11a to 11d as follows to notify the content screen displayed on the distant display 7 and the content screen displayed on the operation display 2 at the icon display 9. For example, as shown in FIG. 9, the controller 24 may display an arc-shaped mark 41a (corresponding to second specific information) on an upper portion of one of the icons 11a to 11d corresponding to the content screen displayed on the distant display 7 and may display an arc-shaped mark 41b (corresponding to first specific information) on a lower portion of one of the icons 11a to 11d corresponding to the content screen displayed on the operation display 2. FIG. 9 illustrates a case where the arc-shaped mark 41a is displayed on the upper portion of the audio icon 11b and the arc-shaped mark 41b is displayed on the lower portion of the air conditioner icon 11d.

Figure 10:
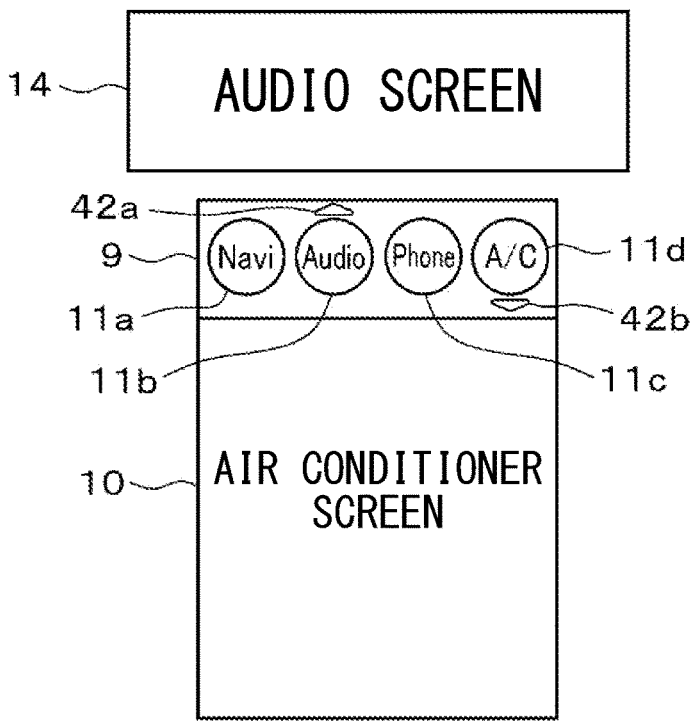
FIG. 10 is a diagram showing another display mode of the icons.
Figure 11:
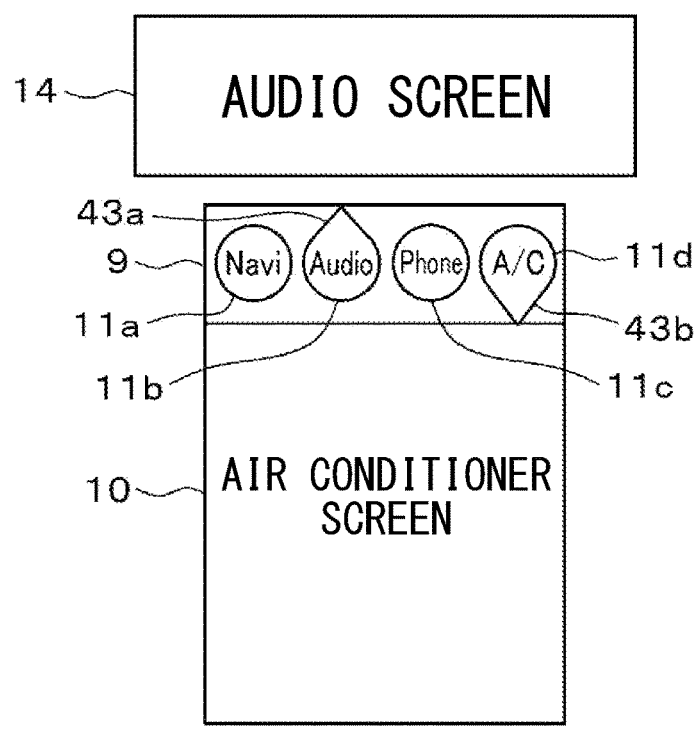
FIG. 11 is a diagram showing another display mode of the icons.

As another example, as shown in FIG. 10, the controller 24 may display an arrow mark 42a (corresponding to the second specific information) on the upper portion of one of the icons 11a to 11d corresponding to the content screen displayed on the distant display 7 and may display an arrow mark 42b (corresponding to the first specific information) on the lower portion of one of the icons 11a to 11d corresponding to the content screen displayed on the operation display 2. As another example, as shown in FIG. 11, the controller 24 may display an extension portion 43a (corresponding to the second specific information) on the upper portion of one of the icons 11a to 11d corresponding to the content screen displayed on the distant display 7 such that the upper portion extends upward, and may display an extension portion 43b (corresponding to the first specific information) on the lower portion of one of the icons 11a to 11d corresponding to the content screen displayed on the operation display 2 such that the lower portion extends downward.

Figure 12:
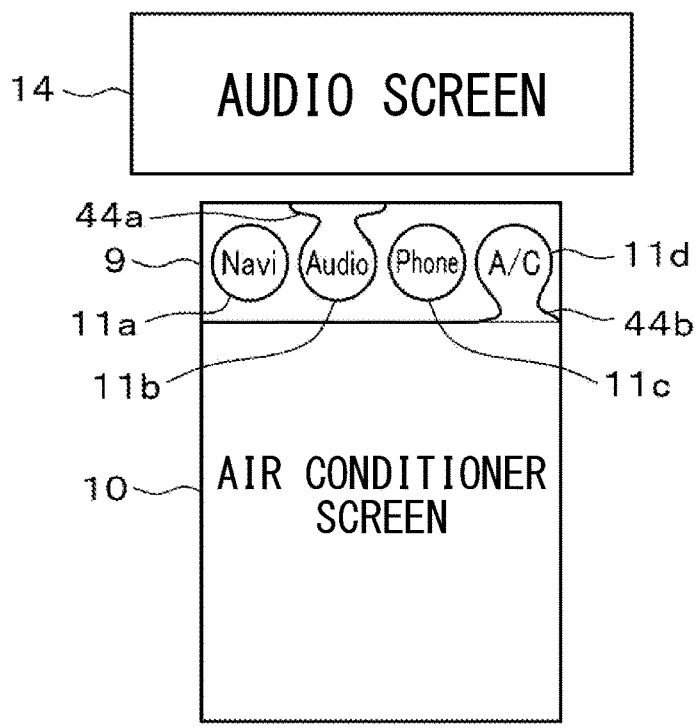
FIG. 12 is a diagram showing another display mode of the icons.
Figure 13:
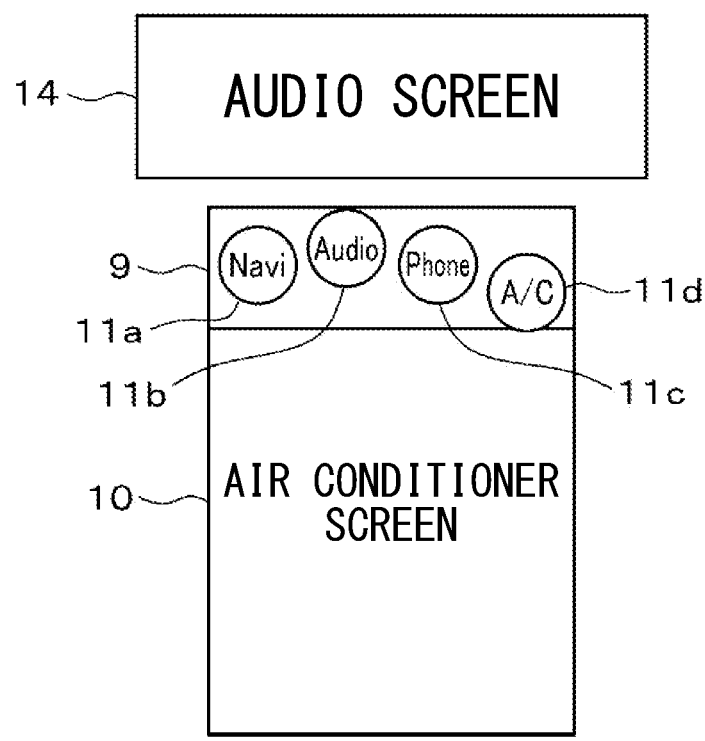
FIG. 13 is a diagram showing another display mode of the icons.
Figure 14:
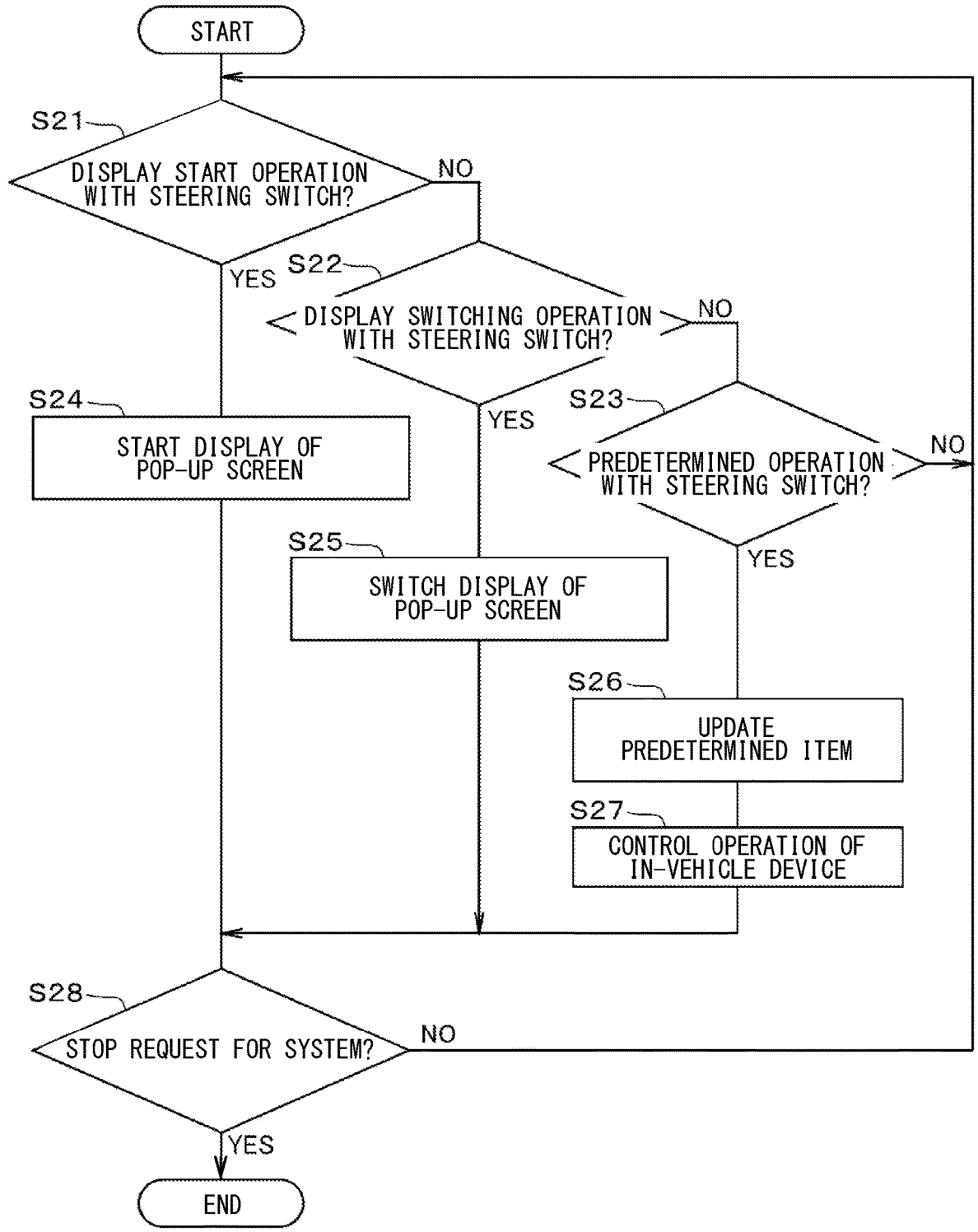
FIG. 14 is a flowchart showing a steering switch operation determination processing.

As another example, as shown in FIG. 12, the controller 24 may display a connection portion 44a (corresponding to the second specific information) on the upper portion of one of the icons 11a to 11d corresponding to the content screen displayed on the distant display 7 such that the upper portion is connected to an upper end portion of the icon display 9, and may display a connection portion 44b (corresponding to the first specific information) on the lower portion of one of the icons 11a to 11d corresponding to the content screen displayed on the operation display 2 such that the lower portion is connected to a lower end portion of the icon display 9. As another example, as shown in FIG. 13, the controller 24 may display one of the icons 11a to 11d corresponding to the content screen displayed on the distant display 7 at a portion shifted upward and may display one of the icons 11a to 11d corresponding to the content screen displayed on the operation display 2 at a portion shifted downward. The controller 24 may change the display mode of the icons 11a to 11d in a way other than the above-described examples.

Further, the controller 24 notifies that the content screen of the distant display 7 and the content screen of the operation display 2 have been switched by performing the cooperative effect on the cooperative effect display 4 as follows. For example, if the cooperative effect display 4 has an LED, the controller 24 may perform an effect such that light flows from a bottom to a top when the content screen of the distant display 7 is switched, and may perform an effect such that light flows from the top to the bottom when the content screen of the operation display 2 is switched. The controller 24 may perform the cooperative effect in a way other than the above-described example.

(2) Steering Switch Operation Determination Processing

The steering switch operation determination processing will be described with reference to FIGS. 14 to 17. When the controller 24 starts the steering switch operation determination processing, the controller 24 monitors whether the user has operated the steering switch 8 (S21 to S23). When the controller 24 receives the first start operation detection signal from the steering switch 8 and determines that the user has operated the steering switch 8 to start displaying the pop-up screen (S21: YES), the controller 24 outputs the pop-up screen control signal to the distant display 7 so that the distant display 7 starts display of the pop-up screen (S24).

When the controller 24 receives the first switching operation detection signal from the steering switch 8 and determines that the user has operated the steering switch 8 to switch the display of the pop-up screen (S22: YES), the controller 24 outputs the pop-up screen control signal to the distant display 7 so that the distant display 7 switches the display of the pop-up screen (S24).

When the controller 24 receives the first predetermined operation detection signal from the steering switch 8 and specifies that the user has operated the steering switch 8 to perform the predetermined operation for the predetermined item in the pop-up screen (S23: YES), the controller 24 outputs the pop-up screen control signal to the distant display 7 so that the distant display 7 updates the display of the predetermined item displayed on the pop-up screen according to the specified predetermined operation (S26). Furthermore, the controller 24 outputs the device control signal to the in-vehicle device to control the operation of the in-vehicle device according to the specified predetermined operation (S27).

The controller 24 determines whether the stop request for the vehicular display control system 15 has be generated (S28), and the above processing is repeated when the controller 24 determines that the stop request for the vehicular display control system 15 has not been generated (S28: NO). The controller 24 determines that the stop request for the vehicular display control system 15 has been generated (S28: YES), for example, when the ACC power supply is switched from on to off when the user gets off the vehicle, and ends the steering switch operation determination processing.

Figure 15:
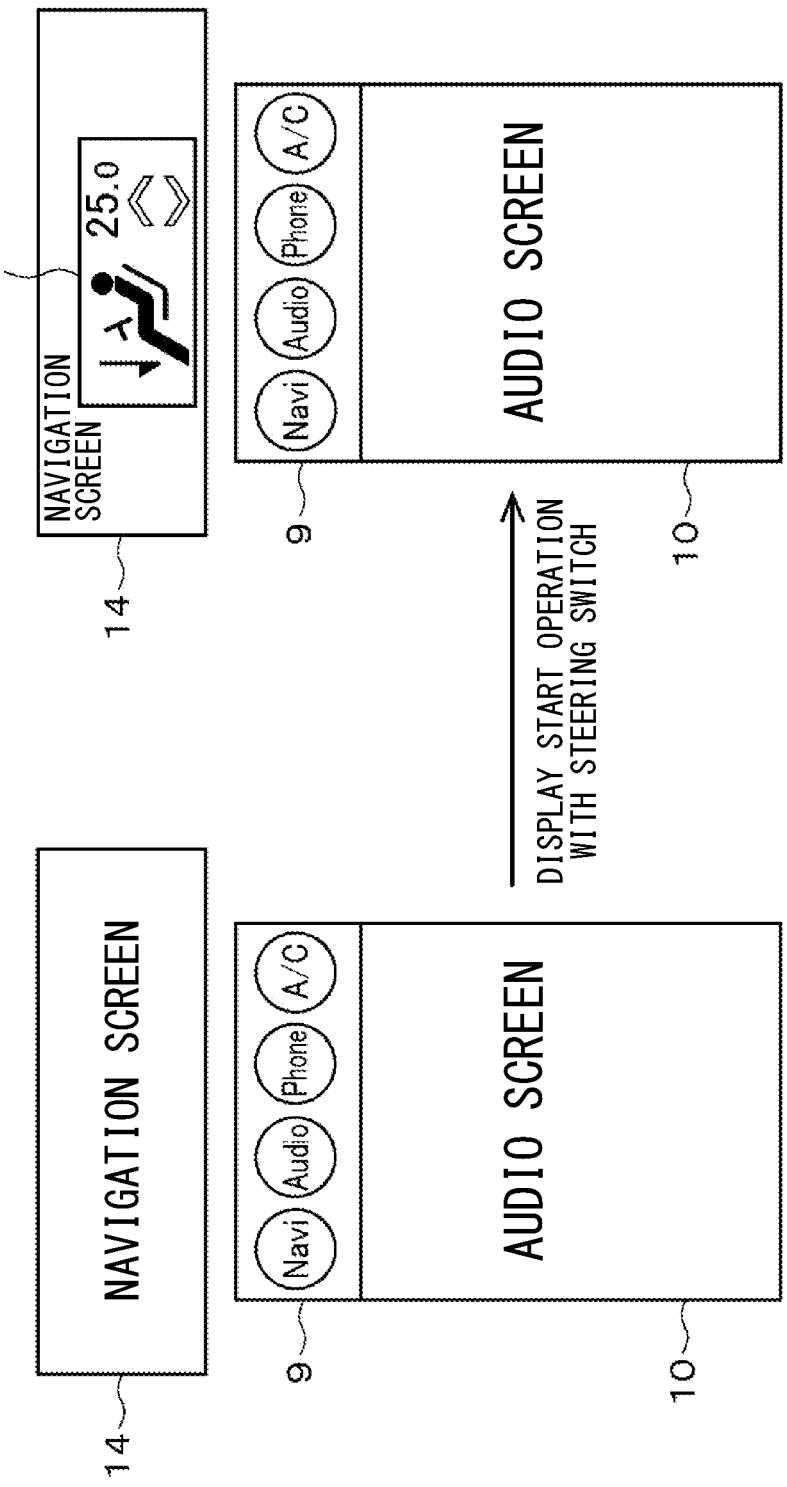
FIG. 15 is a diagram showing a mode in which a pop-up screen is started to be displayed on the distant display.

For example, as shown in FIG. 15, when the user operates the steering switch 8 to start displaying the pop-up screen from the state where the audio screen is displayed on the operation display 2 and the navigation screen is displayed on the distant display 7, the controller 24 instructs the distant display 7 to display a pop-up screen A1 capable of setting the air conditioner for the driver's seat.

Figure 16:
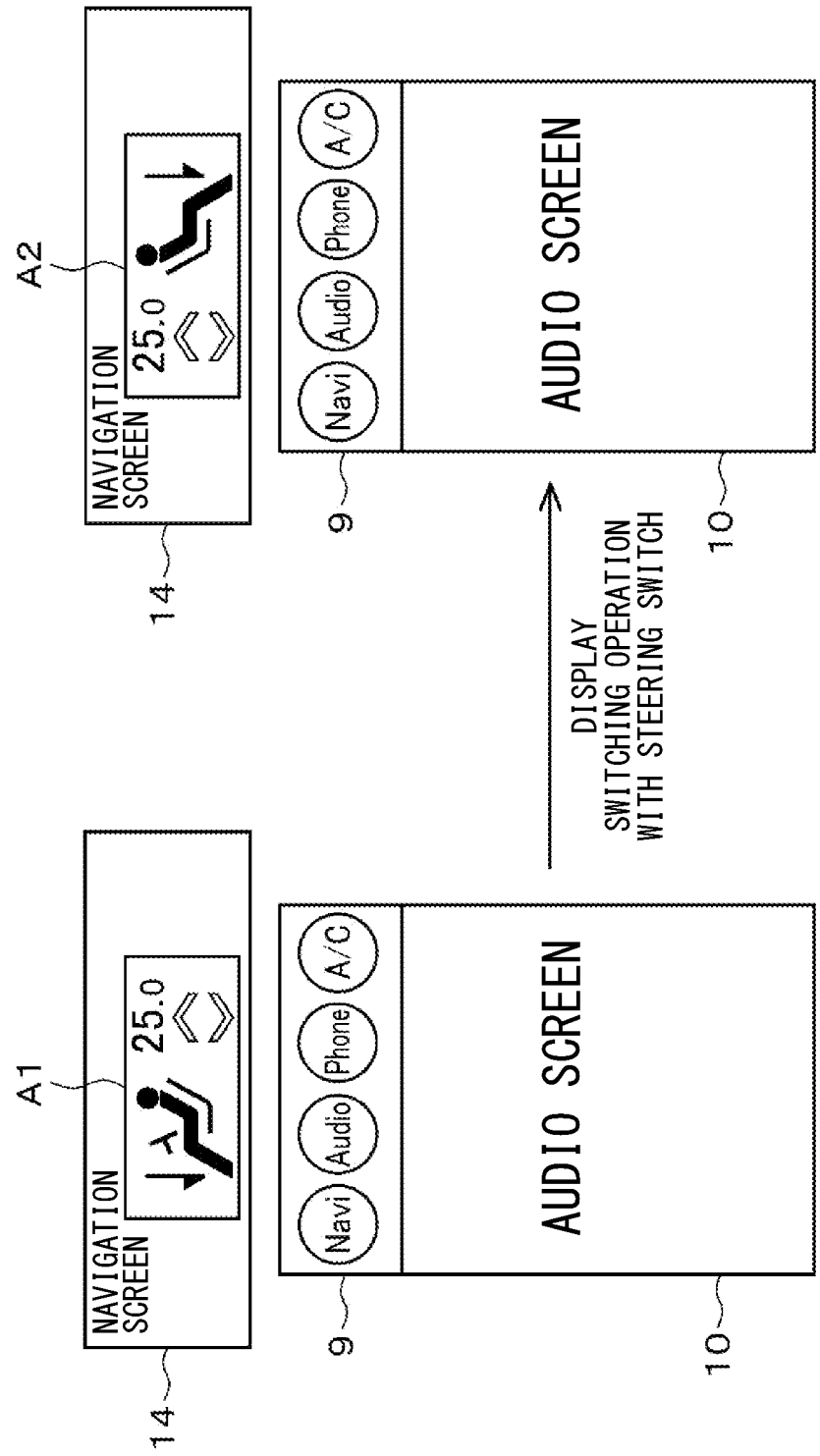
FIG. 16 is a diagram showing a mode in which the display of the pop-up screen is switched on the distant display.

Further, as shown in FIG. 16, when the user operates the steering switch 8 to switch the display of the pop-up screen from the state where the pop-up screen A1 capable of setting the air conditioner for the driver's seat is displayed, the controller 24 instructs the distant display 7 to switch the display from the pop-up screen A1 capable of setting the air conditioner for the driver's seat to a pop-up screen A2 capable of setting the air conditioner for the passenger's seat.

Figure 17:
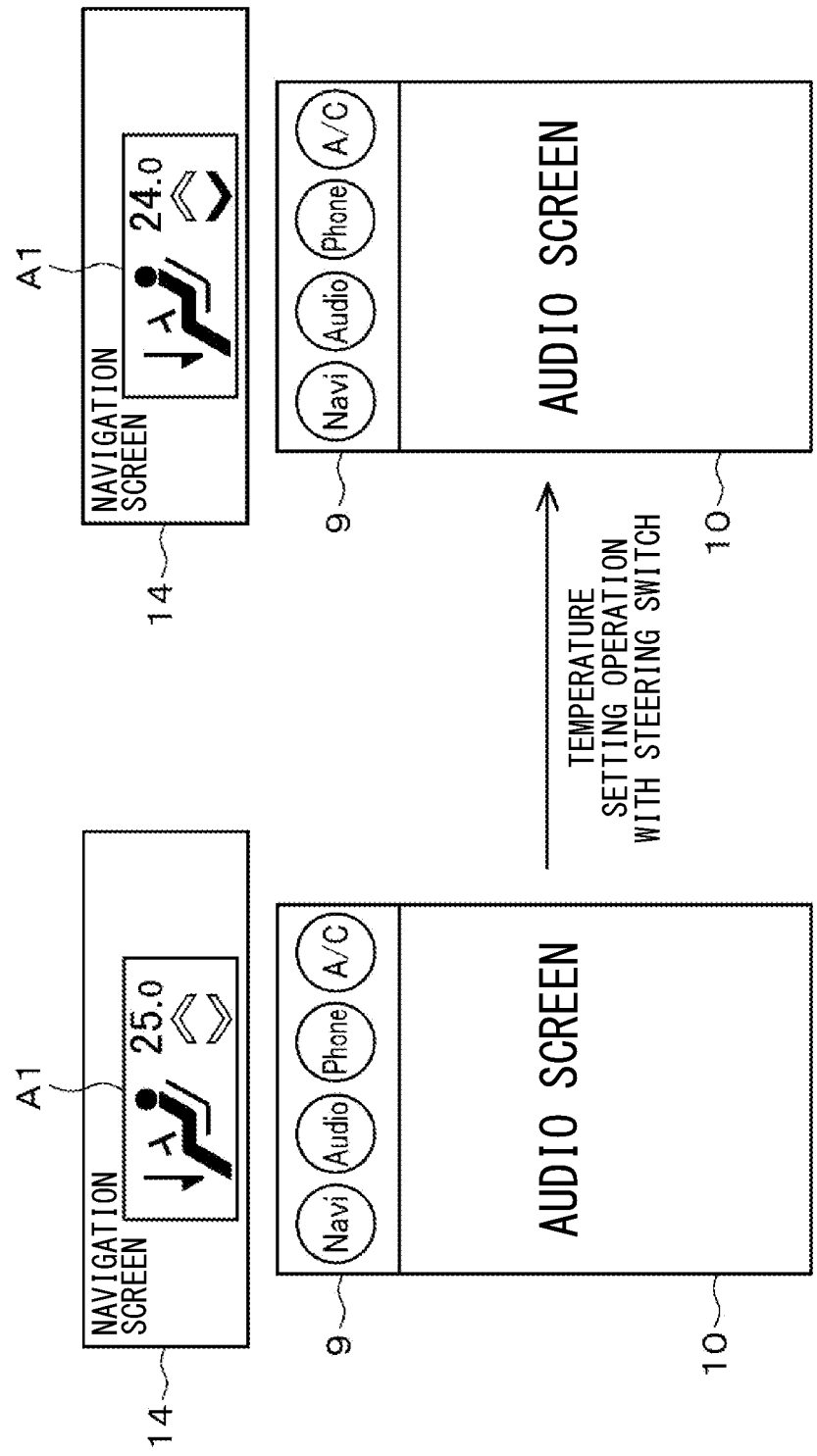
FIG. 17 is a diagram showing a mode in which a display of a predetermined item in the pop-up screen is updated.
Figure 18:
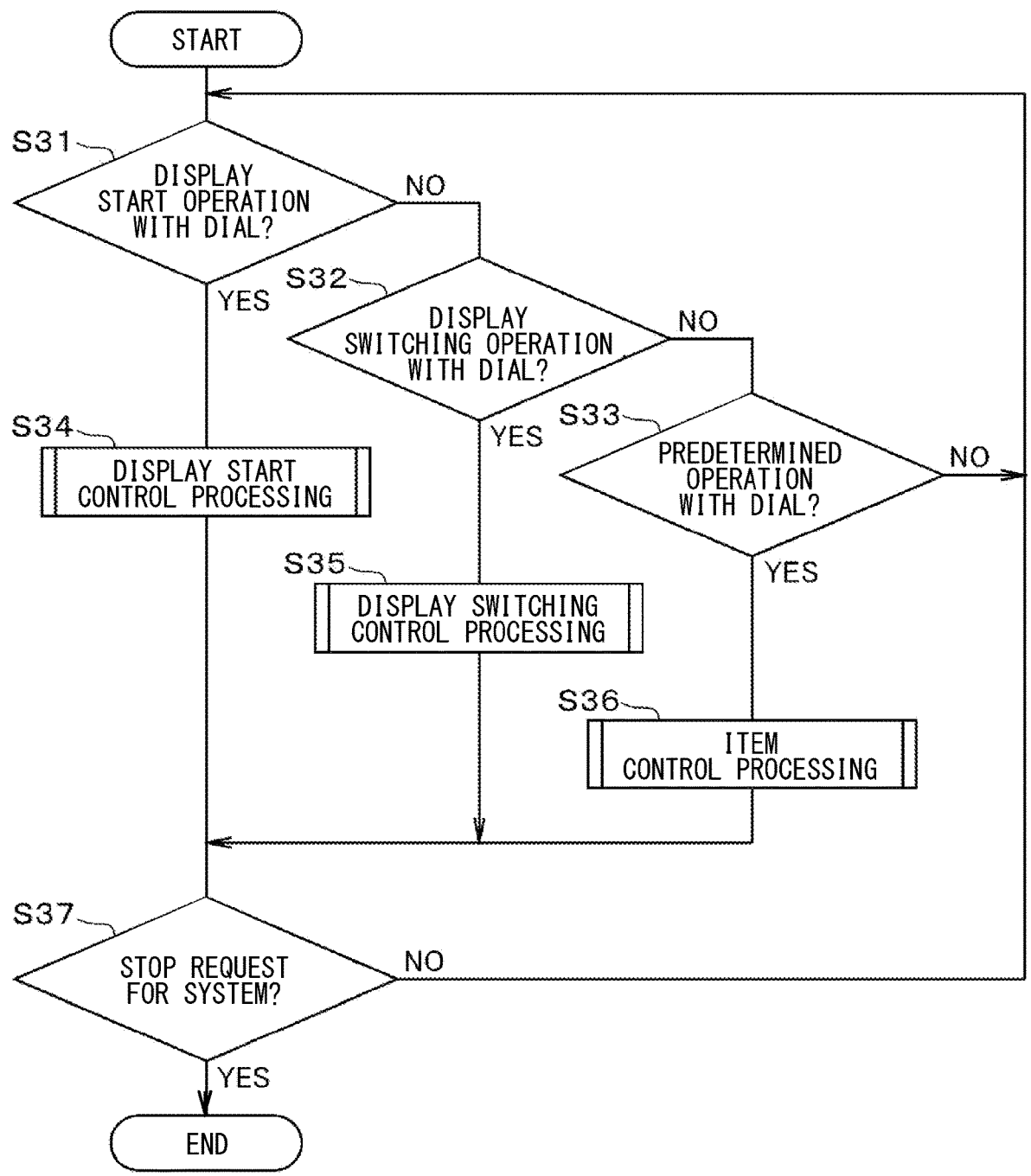
FIG. 18 is a flowchart showing dial operation determination processing.
Figure 19:
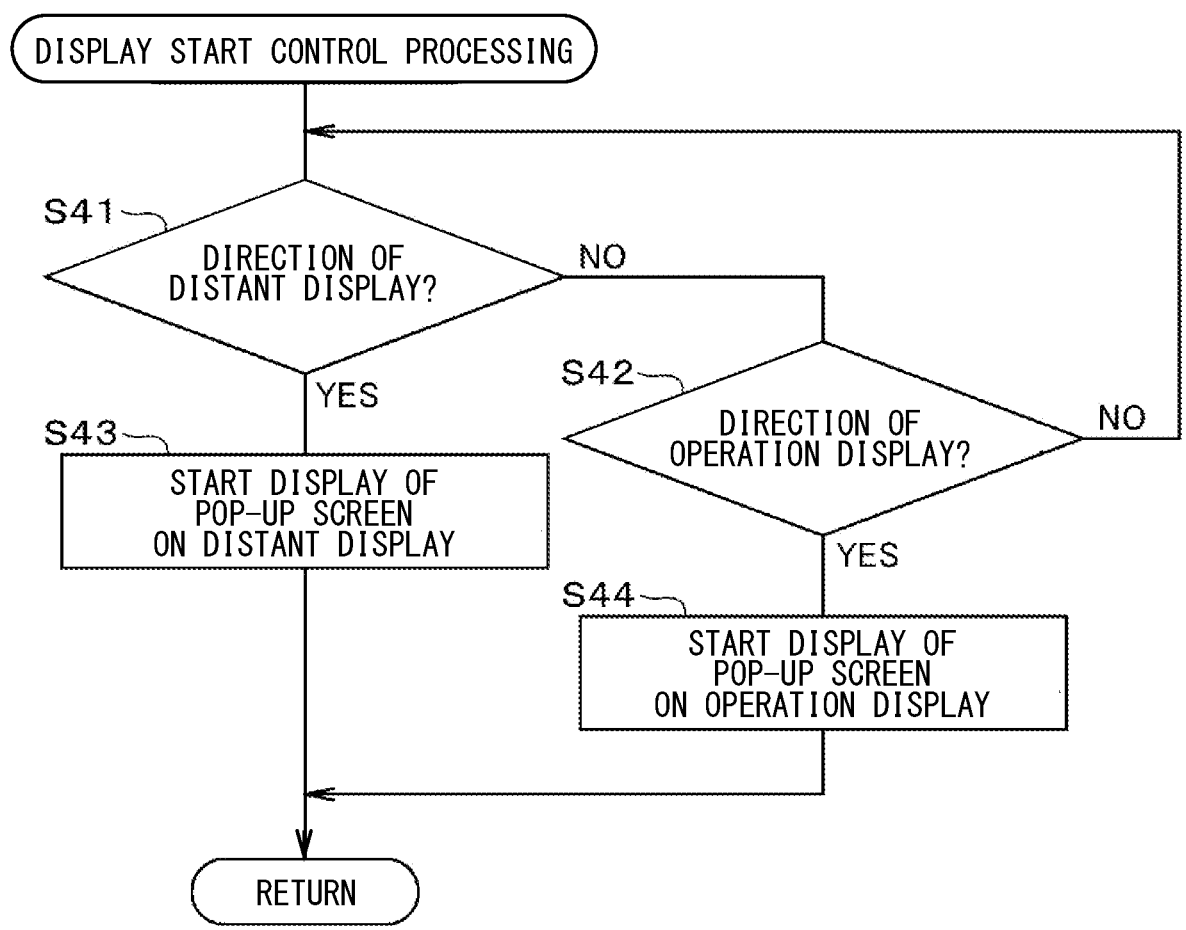
FIG. 19 is a flowchart showing display start control processing in the dial operation determination processing.
Figure 20:
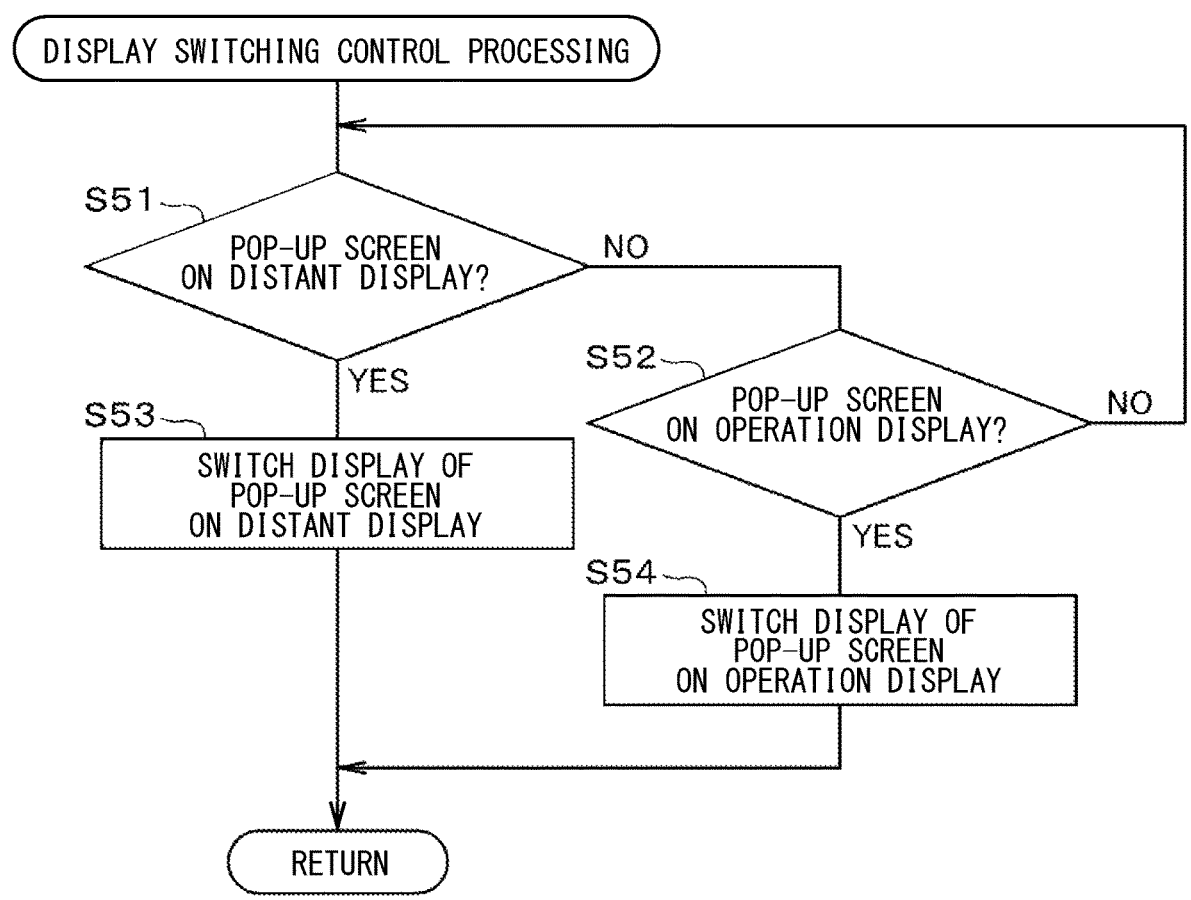
FIG. 20 is a flowchart showing display switching control processing in the dial operation determination processing.
Figure 21:
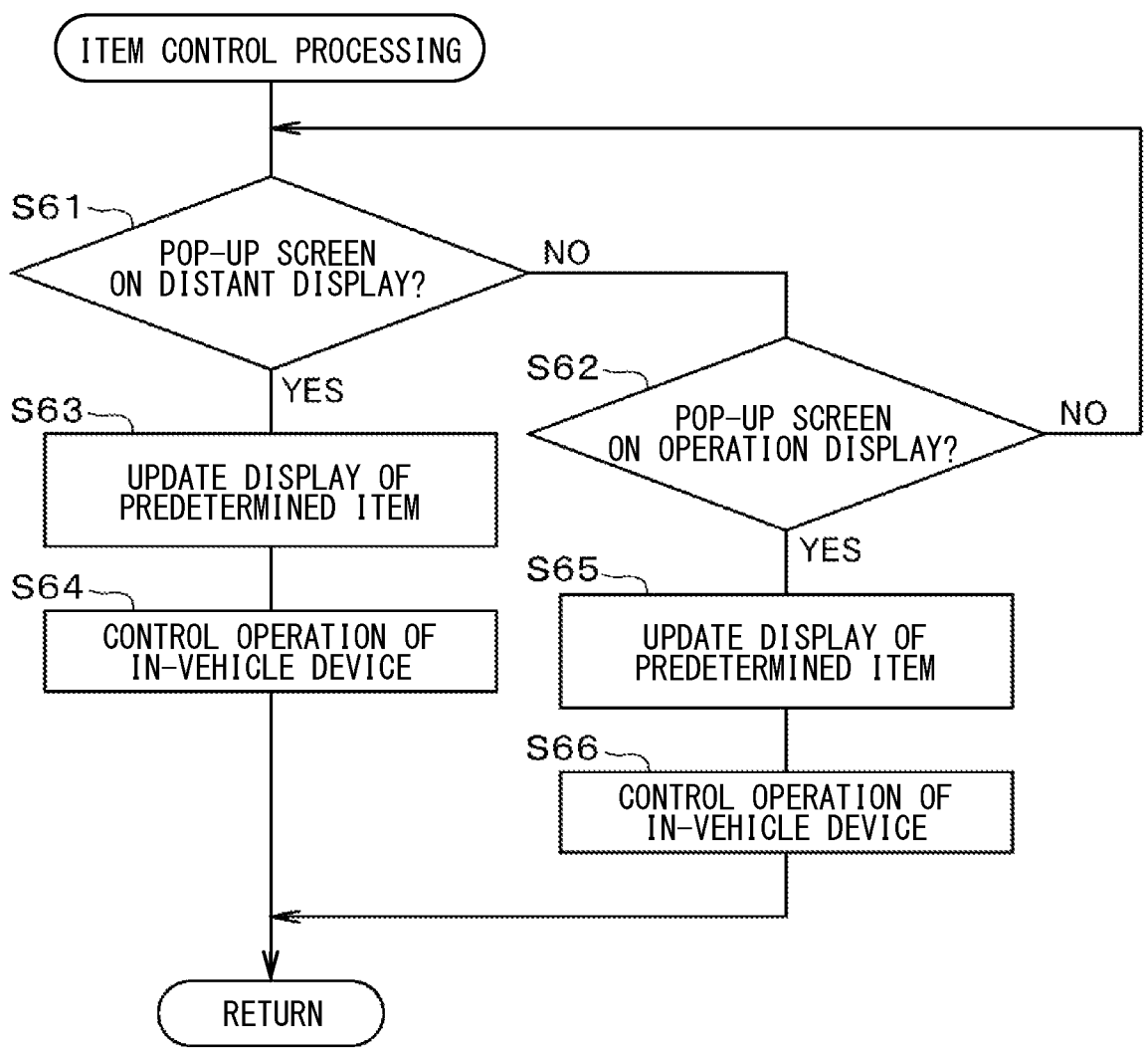
FIG. 21 is a flowchart showing item control processing in the dial operation determination processing.

Further, as shown in FIG. 17, when the user operates the steering switch 8 to perform the temperature setting operation from the state where the pop-up screen A1 capable of setting the air conditioner for the driver's seat is displayed, the controller 24 instructs the distant display 7 to update the display of the temperature setting in the pop-up screen and controls the operation of the air conditioner device 33 according to the temperature setting operation. FIG. 17 illustrates a case where the display of the temperature setting is updated from "25.0" to "24.0" in response to the user operating the steering switch 8 to lower the temperature.

The controller 24 may set the pop-up screen that is displayed first immediately after the user operates the steering switch 8 to start displaying the pop-up screen to be a default pop-up screen or a pop-up screen displayed at the end of the previous time. That is, the pop-up screen is not limited to the temperature setting screen, but may be any screen such as a wind direction setting screen or an air volume setting screen. The controller 24 may delete the pop-up screen being displayed when the user operates the steering switch 8, or when an elapsed time from the start of the display reaches a predetermined time.

(3) Dial Operation Determination Processing

The dial operation determination processing will be described with reference to FIGS. 18 to 24. When the controller 24 starts the dial operation determination processing, the controller 24 monitors whether the user has operated the dial 12 (S31 to S33). When the controller 24 receives the second start operation detection signal from the dial 12 and determines that the user has operated the dial 12 to perform the display start operation of the pop-up screen (S31: YES), the controller 24 proceeds to display start control processing (S34).

When the controller 24 proceeds to the display start control processing, the controller 24 determines the sight line direction of the user at that time (S41, S42). When the controller 24 determines that the sight line direction of the user is in the direction of the distant display 7 (S41: YES), the controller 24 outputs the pop-up screen control signal to the distant display 7 so that the distant display 7 starts displaying the pop-up screen (S43). When the controller 24 determines that the sight line direction of the user is in the direction of the operation display 2 (S42: YES), the controller 24 outputs the pop-up screen control signal to the operation display 2 so that the operation display 2 starts displaying the pop-up screen (S44).

When the controller 24 receives the second switching operation detection signal from the dial 12 and determines that the user has operated the dial 12 to perform the display switching operation of the pop-up screen (S32: YES), the controller 24 proceeds to display switching control processing (S35).

When the controller 24 proceeds to the display switching control processing, the controller 24 determines whether the pop-up screen is being displayed on the operation display 2 or the distant display 7 at that time (S51, S52). When the controller 24 determines that the pop-up screen is being displayed on the distant display 7 at that time (S51: YES), the controller 24 outputs the pop-up screen control signal to the distant display 7 and switches the display of the pop-up screen on the distant display 7 (S53). When the controller 24 determines that the pop-up screen is being displayed on the operation display 2 at that time (S52: YES), the controller 24 outputs the pop-up screen control signal to the operation display 2 and switches the display of the pop-up screen on the operation display 2 (S54).

When the controller 24 receives the second predetermined operation detection signal from the dial 12 and determines that the user has operated the dial 12 to perform the predetermined operation for the predetermined item in the pop-up screen (S33: YES), the controller 24 proceeds to item control processing (S36).

When the controller 24 proceeds to the item control processing, the controller 24 determines whether the pop-up screen is being displayed on the operation display 2 or the distant display 7 at that time (S61, S62). When the controller 24 determines that the pop-up screen is being displayed on the distant display 7 at that time (S61: YES), the controller 24 outputs the pop-up screen control signal to the distant display 7 so that the distant display 7 updates the display of the predetermined item displayed on the pop-up screen (S63). Furthermore, the controller 24 outputs the device control signal to the in-vehicle device to control the operation of the in-vehicle device according to the specified predetermined operation (S64). When the controller 24 determines that the pop-up screen is being displayed on the operation display 2 at that time (S62: YES), the controller 24 outputs the pop-up screen control signal to the operation display 2 so that the operation display 2 updates the display of the predetermined item displayed on the operation display 2. Furthermore, the controller 24 outputs the device control signal to the in-vehicle device to control the operation of the in-vehicle device according to the specified predetermined operation (S66).

The controller 24 determines whether the stop request for the vehicular display control system 15 has be generated (S37), and the above processing is repeated when the controller 24 determines that the stop request for the vehicular display control system 15 has not been generated (S37: NO). The controller 24 determines that the stop request for the vehicular display control system 15 has been generated (S37: YES), for example, when the ACC power supply is switched from on to off when the user gets off the vehicle, and ends the dial operation determination processing.

Figure 22:
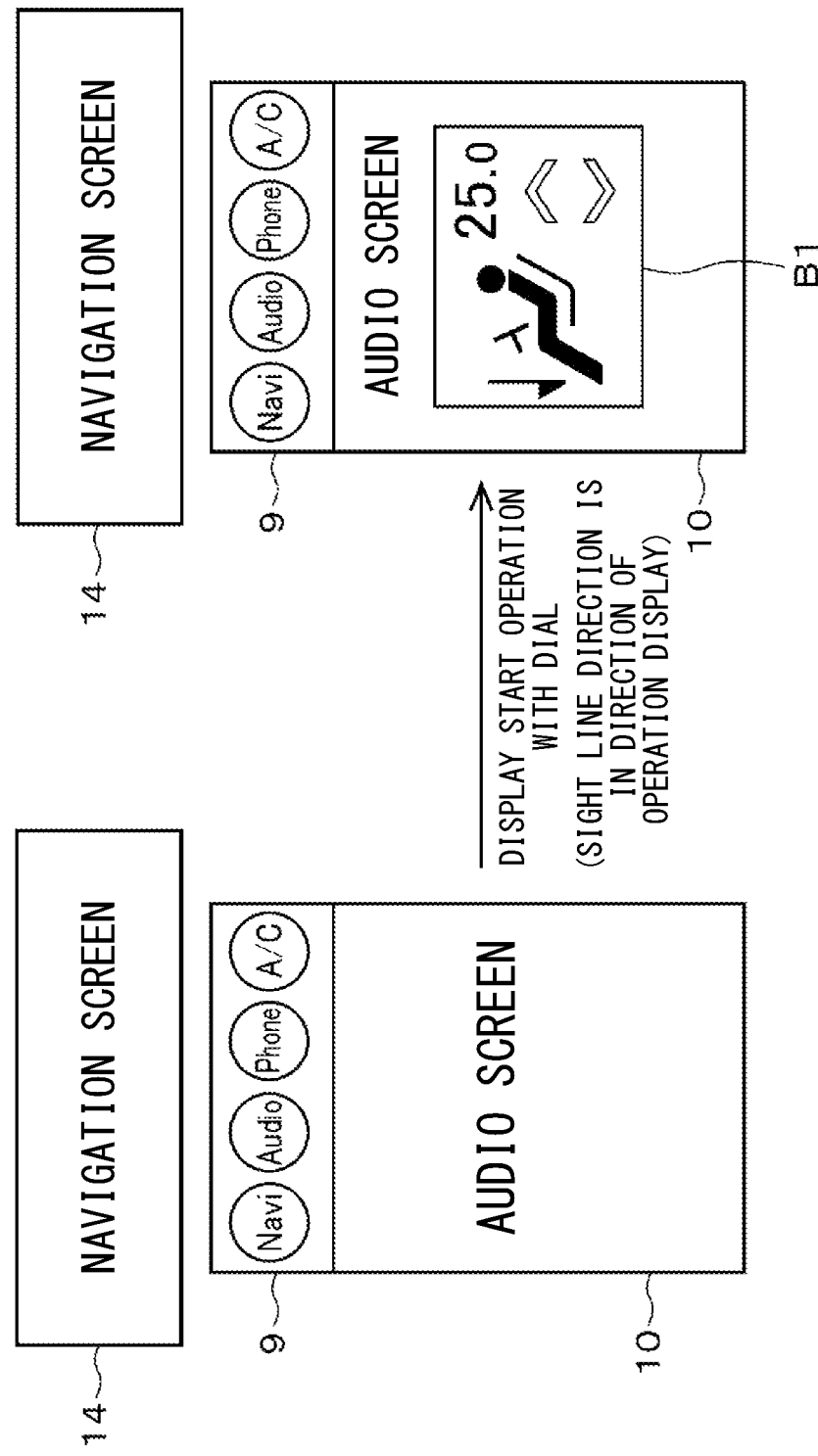
FIG. 22 is a diagram showing a mode in which a pop-up screen is started to be displayed on the operation display.

For example, as shown in FIG. 22, when the user touches the dial 12 to start displaying the pop-up screen from the state where the audio screen is displayed on the operation display 2 and the navigation screen is displayed on the distant display 7, if the sight line direction of the user at that time is in the direction of the operation display 2, the controller 24 starts displaying a pop-up screen B1 capable of setting the air conditioner for the driver's seat on the operation display 2. On the other hand, if the sight line direction of the user at that time is in the direction of the distant display 7, the controller 24 starts displaying the pop-up screen A1 capable of setting the air conditioner for the driver's seat on the distant display 7 as shown in FIG. 15.

Figure 23:
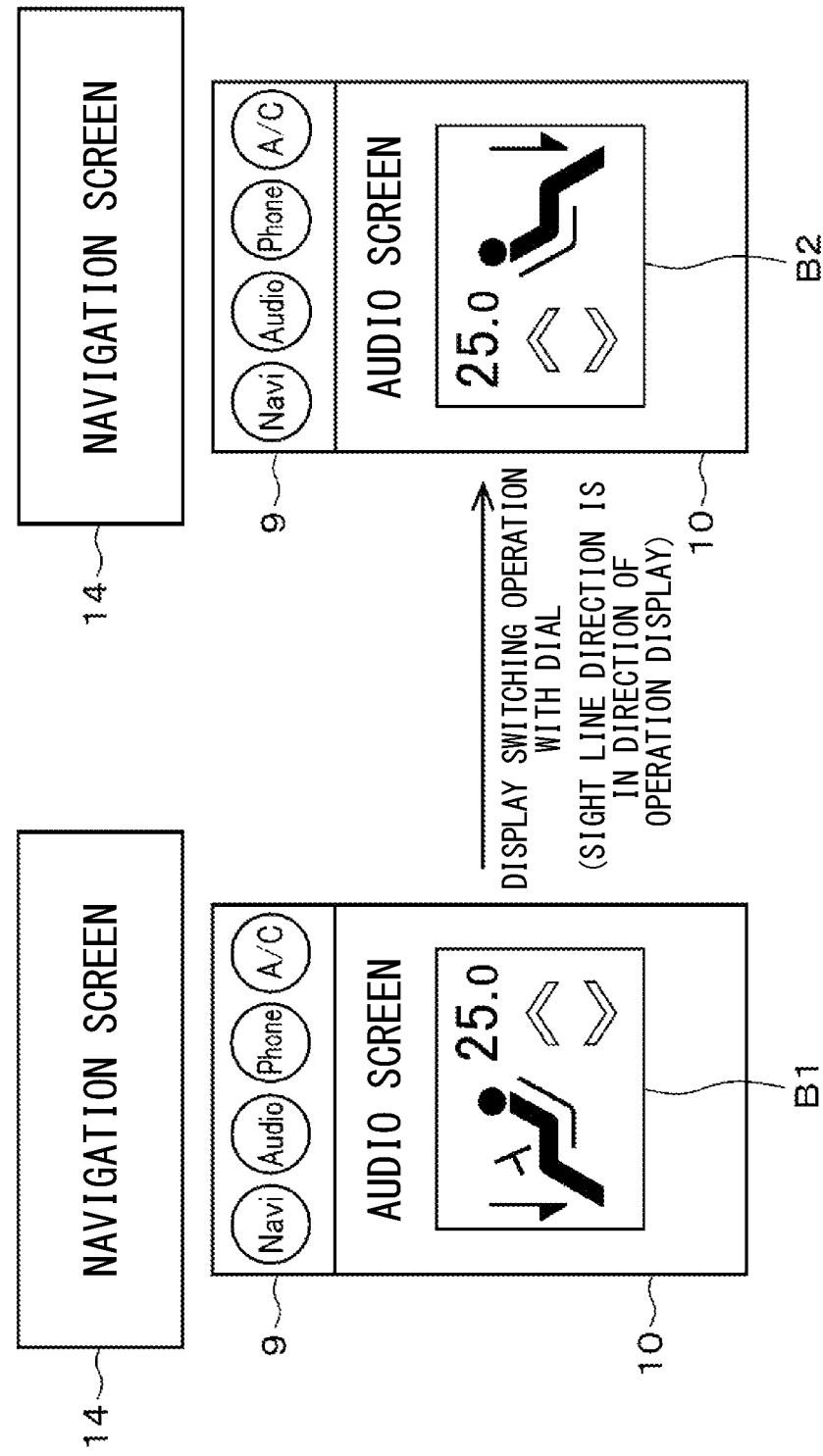
FIG. 23 is a diagram showing a mode in which the display of the pop-up screen is switched on the operation display.

As shown in FIG. 23, when the user presses the dial 12 to switch the display of the pop-up screen from the state where the pop-up screen B1 capable of setting the air conditioner for the driver's seat is displayed, the controller 24 switches the display of the operation display 2 from the pop-up screen B1 capable of setting the air conditioner for the driver's seat to a pop-up screen B2 capable of setting the air conditioner for the passenger's seat, for example.

Figure 24:
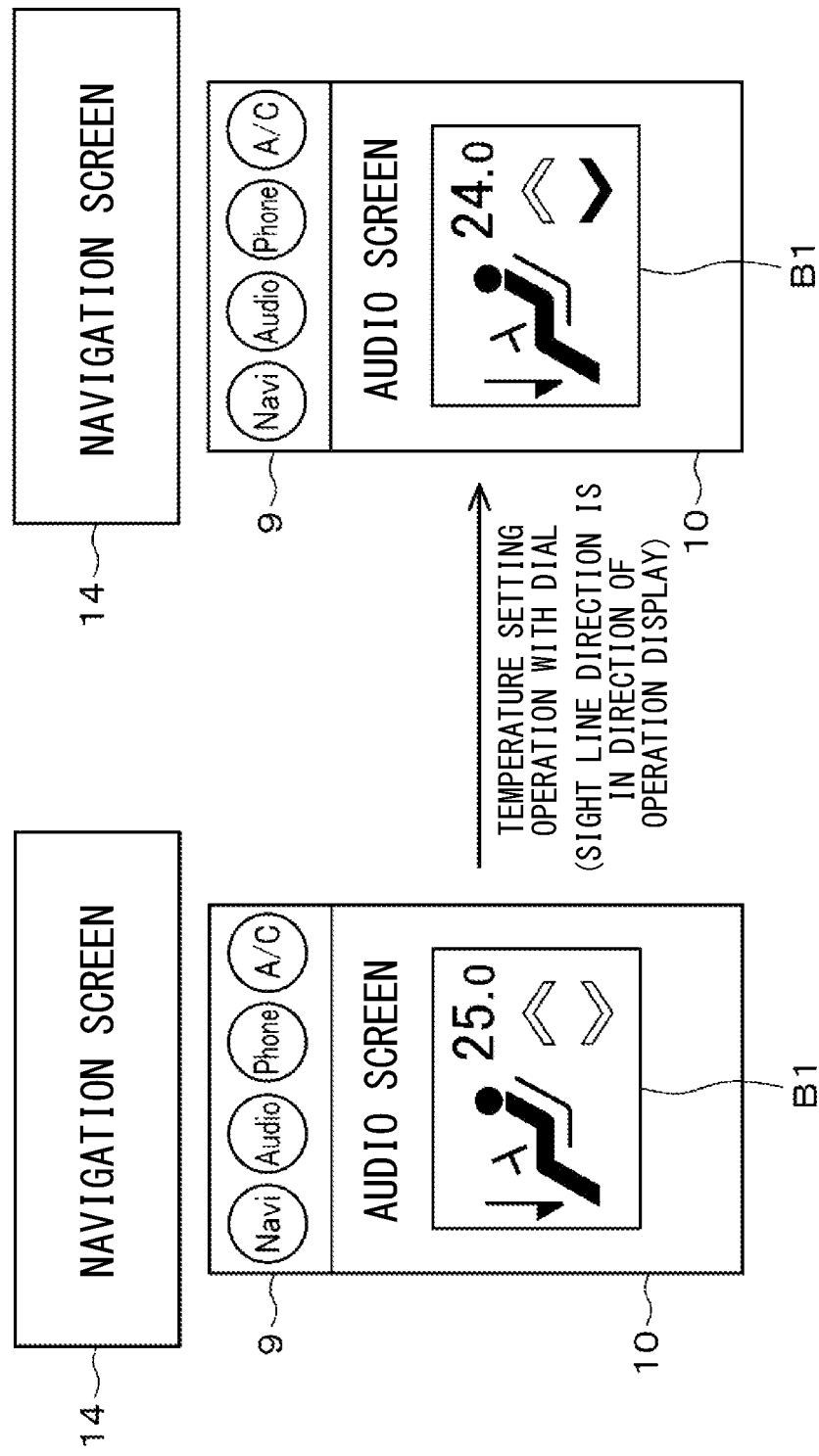
FIG. 24 is a diagram showing a mode in which the display of the predetermined item in the pop-up screen is updated.

As shown in FIG. 24, when the user rotates the dial 12 to perform the temperature setting operation from the state where the pop-up screen B1 capable of setting the air conditioner for the driver's seat is displayed, the controller 24 updates the display of the temperature setting on the pop-up screen and controls the operation of the air conditioner device 33 according to the temperature setting operation. FIG. 24 illustrates a case where the temperature setting display is updated from "25.0" to "24.0" in response to the user rotating the dial 12 to lower the temperature.

Also in this case, the controller 24 may set the pop-up screen that is displayed first immediately after the user operates the dial 12 to start displaying the pop-up screen to be the default pop-up screen or the pop-up screen displayed at the end of the previous time. That is, the pop-up screen is not limited to the temperature setting screen, but may be any screen such as a wind direction setting screen or an air volume setting screen. The controller 24 may delete the pop-up screen being displayed when the user operates the dial 12, or when the elapsed time from the start of the display reaches the predetermined time.

The configuration for displaying the pop-up screen related to the air conditioner function has been exemplified above, but a configuration for displaying the pop-up screen related to the navigation function, the audio function, or the telephone function may also be employed. The contents to be displayed as the pop-up screen may be set by the user. Each time the user presses the dial 12, a setting item may be changed in the order of a temperature setting for the driver's seat, a wind direction setting for the driver's seat, an air volume setting for the driver's seat, a temperature setting for the passenger's seat, a wind direction setting for the passenger's seat, and an air volume setting of the passenger's seat, for example.

The configuration in which one dial 12 is provided has been exemplified above. However, for example, two dials may be arranged side by side in the left-right direction, and a dial for setting the temperature, the wind direction, and the air volume for the driver's seat, and a dial for setting the temperature, the wind direction, and the air volume for the passenger's seat may be independent from each other.

The configuration described in the present embodiment can provide advantages below. In the vehicular display control system 15, the screen switching operation of the operation display 2 and the distant display 7 can be performed by the user operating the operation display 2. When the screen switching operation of the operation display 2 by the user is accepted, the display of the content screen of the operation display 2 is switched, and when the screen switching operation of the distant display 7 by the user is accepted, the display of the content screen of the distant display 7 is switched. Accordingly, the user can appropriately switch the display of the content screens of both the operation display 2 and the remote display 7 without impairing the operability and safety. Further, since the display of the content screen of the distant display 7 can be switched by the user operating the operation display 2, it is possible to achieve both visibility during driving and operability at hand.

The operation performed by the user for the icons 11a to 11d is accepted as the screen switching operation. When the user operates the icons 11a to 11d, the user can appropriately switch the display of the content screens of the operation display 2 and the distant display 7.

The operation for switching the display of the content screen of the operation display 2 and the operation for switching the display of the content screen of the distant display 7 are different from each other. Therefore, the user can grasp the operation for switching the display of the content screen of the operation display 2 and the operation for switching the display of the content screen of the distant display 7 without confusion.

For example, the arc-shaped mark 41a is displayed on the upper portion of the icons 11a to 11d corresponding to the content screen displayed on the distant display 7, and the arc-shaped mark 41b is displayed on the lower portion of the icons 11a to 11d corresponding to the content screen displayed on the operation display 2. Based on the display mode of the icons 11a to 11d, the user can appropriately grasp the content screen displayed on the distant display 7 and the content screen displayed on the operation display 2.

When the user operates the steering switch 8, the display of the pop-up screen on the distant display 7 is started or switched, or the display of the predetermined item on the pop-up screen is updated and the operation of the in-vehicle device is controlled. Therefore, the user can appropriately perform various operations while ensuring visibility during driving.

When the user operates the dial 12, the display of the pop-up screen is started or switched, or the display of the predetermined item on the pop-up screen is updated on the operation display 2 or the distant display 7 according to the sight line direction of the user, and the operation of the in-vehicle device is performed. Therefore, the user can appropriately perform various operations according to the sight line direction of the user.

While the present disclosure has been described based on the embodiment, the present disclosure is not limited to the embodiment or structure described herein. The present disclosure encompasses various modifications and variations within the scope of equivalents. Additionally, various combinations and configurations, as well as other combinations and configurations including more, less, or only a single element, are within the scope and spirit of the present disclosure. The content screens are not limited to the navigation screen, the audio screen, the telephone screen, and the air conditioner screen, and may be, for example, an application screen.

The content screen display is not limited to the configuration provided on the operation display 2 or the distant display 7, but may be provided on a head-up display or the meter display 6. Three or more content screens may be simultaneously displayed on three or more displays having different arrangement positions.

The controllers and methods described in the present disclosure may be implemented by a special purpose computer which is configured with a memory and a processor programmed to execute one or more particular functions embodied in computer programs of the memory. Alternatively, the controllers described in the present disclosure and the methods thereof may be realized by a dedicated computer configured as a processor with one or more dedicated hardware logic circuits. Alternatively, the controller and methods described in the present disclosure may be realized by one or more dedicated computer, which is configured as a combination of a processor and a memory, which are programmed to perform one or more functions, and a processor which is configured with one or more hardware logic circuits. The computer program may also be stored on a computer readable non-transitory tangible recording medium as instructions to be executed by a computer.

What is claimed is:

1. A vehicular display control system comprising:
a first display disposed in a vehicle interior;
a second display disposed in the vehicle interior;
a screen switching operation receiver disposed at a position on a front surface portion of a dashboard and operable by a user sitting on a driver's seat, and configured to receive a first screen switching operation and a second screen switching operation from the user; and
a screen switching controller configured to perform a first screen switching control for switching a display of a content screen on the first display when the screen switching operation receiver receives the first screen switching operation from the user and perform a second screen switching control for switching a display of a content screen on the second display when the screen switching operation receiver receives the second screen switching operation from the user, wherein
each of the first display and the second display is capable of switchingly displaying a plurality of screens as the content screen,
the plurality of screens capable of being switchingly displayed on the first display indicates same content as the plurality of screens capable of being switchingly displayed on the second display,
the screen switching operation receiver includes a touch panel configured to display an icon capable of selecting any one of the plurality of screens and is further configured to receive an operation to the icon by the user as the first screen switching operation or the second screen switching operation, and
the screen switching controller is further configured to:
determine whether the operation by the user is the first screen switching operation or the second screen switching operation;
specify one of the plurality of screens selected by the user;
switch the content screen of the first display to the one of the plurality of screens selected by the user when the operation by the user is the first screen switching operation; and
switch the content screen of the second display to the one of the plurality of screens selected by the user when the operation by the user is the second screen switching operation.

2. The vehicular display control system according to claim 1, wherein
the screen switching operation receiver is further configured to receive a first predetermined operation to the icon by the user as the first screen switching operation and receive a second predetermined operation to the icon by the user as the second screen switching operation.

3. The vehicular display control system according to claim 2, wherein
each of the first predetermined operation and the second predetermined operation is performed by the user directly to the icon displayed on the touch panel,
the first predetermined operation is one of a flick operation, a touch operation, a press operation, or a drag operation, and
the second predetermined operation is another of the flick operation, the touch operation, the press operation, or the drag operation.

4. The vehicular display control system according to claim 1, wherein
the first display is disposed at the position on the front surface portion of the dashboard and operable by the user sitting on the driver's seat, and
the screen switching operation receiver and the first display are integrally provided.

5. The vehicular display control system according to claim 1, wherein
the screen switching operation receiver is further configured to display first specifying information and second specifying information in addition to the icon, and
the first specifying information is capable of specifying the content screen being displayed on the first display and the second specifying information is capable of specifying the content screen being displayed on the second display.

6. The vehicular display control system according to claim 1, wherein
the second display is disposed at a position in the vehicle interior visible to the user without moving a sight line from forward of a vehicle,
the vehicular display control system further comprising:
a first start operation receiver configured to receive a display start operation of a pop-up screen from the user; and
a first display controller configured to instruct the second display to start a display of the pop-up screen when the first start operation receiver receives the display start operation from the user.

7. The vehicular display control system according to claim 6, further comprising
a first switching operation receiver configured to receive a display switching operation of the pop-up screen from the user, wherein the first display controller is further configured to instruct the second display to switch the display of the pop-up screen when the first switching operation receiver receives the display switching operation from the user.

8. The vehicular display control system according to claim 6, further comprising:
a device controller configured to control an operation of an in-vehicle device; and
a first predetermined operation receiver configured to receive a predetermined operation to a predetermined item in the pop-up screen from the user, wherein
the device controller is further configured to control the operation of the in-vehicle device according to the predetermined operation when the first predetermined operation receiver receives the predetermined operation from the user, and
the first display controller is further configured to update the display of the predetermined item in the pop-up screen when the first predetermined operation receiver receives the predetermined operation from the user.

9. The vehicular display control system according to claim 1, wherein
the first display is disposed at the position on the front surface portion of the dashboard and operable by the user sitting on the driver's seat, and
the second display is disposed at a position in the vehicle interior visible to the user without moving a sight line from forward of a vehicle,
the vehicular display control system further comprising:
a second start operation receiver provided in the first display and configured to receive a display start operation of a pop-up screen from the user;
a sight line direction specifier configured to specify a sight line direction of the user; and
a second display controller configured to instruct the first display to start a display of the pop-up screen when the second start operation receiver receives the display start operation from the user and the sight line direction specifier specifies that the sight line direction of the user is in a direction of the first display, and instruct the second display to start a display of the pop-up screen when the second start operation receiver receives the display start operation from the user and the sight line direction specifier specifies that the sight line direction of the user is in a direction of the second display.

10. The vehicular display control system according to claim 9, further comprising:
a second switching operation receiver configured to receive a display switching operation of the pop-up screen from the user, wherein
the second display controller is further configured to switch the display of the pop-up screen according to the display switching operation when the second switching operation receiver receives the display switching operation.

11. The vehicular display control system according to claim 9, further comprising:
a display controller configured to control an operation of an in-vehicle device; and
a second predetermined operation receiver configured to receive a predetermined operation to a predetermined item in the pop-up screen from the user, wherein
the display controller is further configured to control the operation of the in-vehicle device according to the predetermined operation when the second predetermined operation receiver receives the predetermined operation from the user, and
the second predetermined operation receiver is further configured to update the display of the predetermined item in the pop-up screen when the second predetermined operation receiver receives the predetermined operation from the user.

12. The vehicular display control system according to claim 1, wherein
the plurality of screens capable of being switchingly displayed on each of the first display and the second display include a navigation screen, an audio screen, a telephone screen, and an air conditioner screen.

13. A non-transitory computer readable medium storing a vehicular display control program for a vehicular display control system, wherein
the vehicular display control system includes:
a first display disposed in a vehicle interior;
a second display disposed in the vehicle interior; and
a screen switching operation receiver disposed at a position on a front surface portion of a dashboard and operable by a user sitting on a driver's seat, and configured to receive a first screen switching operation and a second screen switching operation from the user,
the vehicular display control program includes:
a first screen switching control procedure instructing the vehicular display control system to perform a first screen switching control for switching a display of a content screen on the first display when the screen switching operation receiver receives the first screen switching operation from the user; and
a second screen switching control procedure instructing the vehicular display control system to perform a second screen switching control for switching a display of a content screen on the second display when the screen switching operation receiver receives the second screen switching operation, wherein
each of the first display and the second display is capable of switchingly displaying a plurality of screens as the content screen,
the plurality of screens capable of being switchingly displayed on the first display indicates same content as the plurality of screens capable of being switchingly displayed on the second display,
the screen switching operation receiver includes a touch panel configured to display an icon capable of selecting any one of the plurality of screens and is further configured to receive an operation to the icon by the user as the first screen switching operation or the second screen switching operation, and
the vehicular display control program further includes procedures instructing the vehicular display control system to:
determine whether the operation by the user is the first screen switching operation or the second screen switching operation;
specify one of the plurality of screens selected by the user;
switch the content screen of the first display to the one of the plurality of screens selected by the user when the operation by the user is the first screen switching operation; and switch the content screen of the second display to the one of the plurality of screens selected by the user when the operation by the user is the second screen switching operation.

14. A vehicular display control system comprising:

a first display disposed in a vehicle interior;

a second display disposed in the vehicle interior;

a touch panel disposed at a position on a front surface portion of a dashboard and operable by a user sitting on a driver's seat, and configured to receive a first screen switching operation and a second screen switching operation from the user; and a controller communicable with the first display, the second display and the touch panel, and including a processor and a memory, the memory storing instructions configured to, when executed by the processor, cause the processor to:

perform a first screen switching control for switching a display of a content screen on the first display when the touch panel receives the first screen switching operation; and perform a second screen switching control for switching a display of a content screen on the second display when the screen switching operation receiver receives the second screen switching operation, wherein each of the first display and the second display is capable of switchingly displaying a plurality of screens as the content screen, the plurality of screens capable of being switchingly displayed on the first display indicates same content as the plurality of screens capable of being switchingly displayed on the second display, the touch panel is further configured to display an icon capable of selecting any one of the plurality of screens and receive an operation to the icon by the user as the first screen switching operation or the second screen switching operation, and the instructions are further configured to, when executed by the processor, cause the processor to:

determine whether the operation by the user is the first screen switching operation or the second screen switching operation;

specify one of the plurality of screens selected by the user;

switch the content screen of the first display to the one of the plurality of screens selected by the user when the operation by the user is the first screen switching operation; and switch the content screen of the second display to the one of the plurality of screens selected by the user when the operation by the user is the second screen switching operation.

\* \* \* \* \*